United States Patent [19]
Trout

[11] Patent Number: 5,749,484
[45] Date of Patent: *May 12, 1998

[54] TAMPER-EVIDENT CHILD-RESISTANT CLOSURE

[75] Inventor: Stanley D. Trout, Huntington, Ind.

[73] Assignee: Rieke Corporation, Auburn, Ind.

[*] Notice: The term of this patent shall not extend beyond the expiration date of Pat. No. 5,609,262.

[21] Appl. No.: 733,223

[22] Filed: Oct. 17, 1996

Related U.S. Application Data

[63] Continuation-in-part of Ser. No. 532,157, Sep. 22, 1995, Pat. No. 5,609,262.

[51] Int. Cl.$^6$ ..................... B65D 55/02
[52] U.S. Cl. ..................... 215/219; 215/252
[58] Field of Search ..................... 215/206, 214, 215/217, 218, 219, 221, 252

[56] References Cited

U.S. PATENT DOCUMENTS

| | | |
|---|---|---|
| 3,878,961 | 4/1975 | Curry et al. |
| 3,888,375 | 6/1975 | Gerk. |
| 3,944,102 | 3/1976 | Grau. |
| 4,364,484 | 12/1982 | Kinsley. |
| 4,433,789 | 2/1984 | Gibilisco. |
| 4,527,701 | 7/1985 | Schaubeck. |
| 4,546,892 | 10/1985 | Couput. |
| 4,598,833 | 7/1986 | Herr. |
| 4,653,657 | 3/1987 | Papavasilopoulos. |
| 4,721,218 | 1/1988 | Gregory et al. |
| 4,801,030 | 1/1989 | Barriac. |
| 4,801,031 | 1/1989 | Barriac. |
| 4,884,706 | 12/1989 | Julian. |
| 4,913,300 | 4/1990 | Wiedmer et al. |
| 4,938,370 | 7/1990 | McBride. |
| 4,971,212 | 11/1990 | Kusz. |
| 4,978,016 | 12/1990 | Hayes. |
| 4,978,017 | 12/1990 | McBride. |
| 4,981,230 | 1/1991 | Marshall et al. |
| 4,997,097 | 3/1991 | Krautkrämer. |
| 5,004,112 | 4/1991 | McBride. |
| 5,005,718 | 4/1991 | Buono. |
| 5,007,545 | 4/1991 | Imbery, Jr. |
| 5,020,681 | 6/1991 | Kusz. |
| 5,080,246 | 1/1992 | Hayes. |
| 5,090,788 | 2/1992 | Ingram et al. |

(List continued on next page.)

FOREIGN PATENT DOCUMENTS

| | | |
|---|---|---|
| 2254688 | 5/1974 | Germany. |
| 3025911 | 1/1982 | Germany. |
| 1441341 | 6/1976 | United Kingdom. |

*Primary Examiner*—Stephen Cronin
*Attorney, Agent, or Firm*—Woodard, Emhardt, Naughton, Moriarty & McNett

[57] ABSTRACT

A child-resistant, tamper-evident closure for a container having an externally threaded neck finish includes a combination of inner and outer caps. The inner cap includes a tamper-evident band which is connected to the inner cap by frangible elements. The inner cap includes folded ratchet-like tabs which are locked in position behind an annular bead. The tabs are arranged so as to engage an annular lip on the neck finish. The outer cap snaps over the inner cap and includes a series of ratchet-like lugs which are directed toward the inner cap. The top surface of the inner cap includes a series of cooperating ratchet-like lugs. So long as a downward force is not exerted on the outer cap, the child-resistant arrangement permits the outer cap to turn relative to the inner cap in a counterclockwise direction. However, when a sufficient downward force is applied, the lugs of the outer cap are drawn into abutment with the cooperating lugs of the inner cap and the outer cap is used to remove the inner cap. In the clockwise direction, the lugs cooperate such that turning of the outer cap advances the inner cap into threaded engagement. In another embodiment, removal of the inner cap from the neck finish is achieved by ovalizing the outer cap so as to bring into engagement ribs on the inner cap with ribs on the inside surface of the sidewall of the outer cap.

11 Claims, 32 Drawing Sheets

U.S. PATENT DOCUMENTS

| | | |
|---|---|---|
| 5,096,079 | 3/1992 | Odet . |
| 5,107,998 | 4/1992 | Zumbuhl . |
| 5,115,929 | 5/1992 | Buono . |
| 5,129,530 | 7/1992 | Fuchs . |
| 5,145,078 | 9/1992 | Hannon et al. . |
| 5,197,616 | 3/1993 | Buono . |
| 5,197,620 | 3/1993 | Gregory . |
| 5,252,068 | 9/1993 | McCandless . |
| 5,271,512 | 12/1993 | Ekkert . |
| 5,280,842 | 1/1994 | Koo . |
| 5,295,600 | 3/1994 | Kowal . |
| 5,310,069 | 5/1994 | Ingram et al. . |
| 5,370,251 | 12/1994 | Buono . |
| 5,397,009 | 3/1995 | Salmon et al. . |
| 5,400,913 | 3/1995 | Kelly . |
| 5,445,283 | 8/1995 | Krautkramer . |
| 5,450,973 | 9/1995 | Ellis et al. . |

5,749,484

TAMPER-EVIDENT CHILD-RESISTANT CLOSURE

REFERENCE TO RELATED APPLICATION

This patent application is a continuation-in-part patent application of application Ser. No. 08/532,157, filed on Sep. 22, 1995 which issued on Mar. 11, 1997 as U.S. Pat. No. 5,609,262.

BACKGROUND OF THE INVENTION

The present invention relates in general to the design of a threaded plastic closure which is used to close off the outlet opening of an open-topped container. More specifically the present invention relates to the design of a threaded closure which is constructed so as to provide either separately or in combination a tamper-evident arrangement and a child-resistant arrangement. As described herein, the present invention includes two styles or embodiments of a closure which is designed to be child-resistant. Each style may be configured with or without a tamper-evident arrangement. Similarly, a closure design which is tamper-evident but not child-resistant is taught by the present invention. Both child-resistant arrangements are achieved by the use of an outer cap which is concentrically configured relative to an inner cap and is snapped over the inner cap so as to be retained in its desired relationship with the inner cap. The elimination of the outer cap removes the intended child-resistant capability.

Plastic, tamper-evident threaded closures have been available for a number of years and are thus regarded as being well-known to a person of ordinary skill in the art. These closures employ a variety of features for various reasons and applications. The tamper-evident arrangements likewise represent a variety of design approaches, though there are quite often certain similarities. The underlying objective is to enable the user of the product to determine whether the initially filled and closed container has been improperly opened which could indicate a tampering attempt. Tamper-evident closures have commonly been made of aluminum or plastic, with one type of closure including an upper cap portion and a lower security ring or band attached to the cap portion by a failure line. When the two-piece cap is removed, the closure breaks along the failure line, leaving the ring separate from the cap portion.

While this art is quite crowded, the following listed patent references are believed to provide a representative sampling of earlier tamper-evident closures which relate generally to the present invention:

| PATENT NO. | PATENTEE | ISSUE DATE |
|---|---|---|
| 4,546,892 | Couput | Oct. 15, 1985 |
| 4,721,218 | Gregory et al. | Jan. 26, 1988 |
| 4,801,030 | Barriac | Jan. 31, 1989 |
| 4,801,031 | Barriac | Jan. 31, 1989 |
| 4,913,300 | Wiedmer et al. | Apr. 3, 1990 |
| 4,971,212 | Kusz | Nov. 20, 1990 |
| 4,978,016 | Hayes | Dec. 18, 1990 |
| 4,978,017 | McBride | Dec. 18, 1990 |
| 5,090,788 | Ingram et al. | Feb. 25, 1992 |
| 5,107,998 | Zumbuhl | Apr. 28, 1992 |
| 5,129,530 | Fuchs | Jul. 14, 1992 |
| 5,295,600 | Kowal | Mar. 22, 1994 |
| 5,310,069 | Ingram et al. | May 10, 1994 |
| 5,397,009 | Salmon et al. | Mar. 14, 1995 |
| 5,400,913 | Kelly | Mar. 28, 1995 |
| 4,884,706 | Julian | Dec. 5, 1989 |

-continued

| PATENT NO. | PATENTEE | ISSUE DATE |
|---|---|---|
| 5,080,246 | Hayes | Jan. 14, 1992 |
| 5,145,078 | Hannon et al. | Sep. 8, 1992 |
| 5,197,620 | Gregory | Mar. 30, 1993 |
| 5,271,512 | Ekkert | Dec. 21, 1993 |
| 4,653,657 | Papavasilopoulos | Mar. 31, 1987 |
| 4,938,370 | McBride | Jul. 3, 1990 |
| 4,981,230 | Marshall et al. | Jan. 1, 1991 |
| 5,004,112 | McBride | Apr. 2, 1991 |
| 5,252,068 | McCandless | Sep. 7, 1993 |
| 3,944,102 | Grau | Mar. 16, 1976 |
| 3,878,961 | Curry et al. | Apr. 22, 1975 |
| 5,445,283 | Krautkramer | Aug. 29, 1995 |
| 3,888,375 | Gerk | Jun. 10, 1975 |
| 5,450,973 | Ellis et al. | Sep. 19, 1995 |
| 5,096,079 | Odet | Mar. 17, 1992 |
| FOREIGN | | |
| 2,254,688 | Germany | May, 1974 |
| 3,025,911 | Germany | Jan., 1982 |
| 1,441,341 | U.K. | Jun., 1976 |

While the foregoing references should adequately summarize the state of the art, there are other aspects of the present invention which deserve additional consideration relative to any earlier references which may be relevant. One feature of the present invention is the addition of an outer cap so as to convert the basic closure, whether tamper-evident or not, into a child-resistant closure. In one embodiment of the present invention, a unique arrangement of ratchet teeth in the outer circumferential periphery of the outer cap in combination with circumferential depressions in the upper surface of the inner cap provide the means of advancing the inner cap onto the threaded outlet opening through ratchet and depression engagement. In this embodiment, retrograde removal of the inner cap, which would be achieved in the normal manner of counterclockwise rotation of the outer cap, is accomplished by other means which do not involve ratchet tooth engagement. Removal of the inner cap according to the present invention requires ovalizing of the outer cap so as to draw portions of the outer cap into engagement with the inner cap, at which point axial ribs are drawn into abutment in order to transfer rotational torque from the outer cap to the inner cap.

In another embodiment of the present invention, lugs are formed in the upper surface of the inner cap near the upper surface-sidewall corner. Cooperating lugs are formed in the outer cap and the interfit of these two series of lugs enables the inner cap to be threadedly advanced onto the outlet opening by turning the outer cap. A plurality of angled/offset sections or ramps on both caps are used to achieve disengagement of the inner cap from the outlet opening. However, these angled/offset sections do not engage one another unless there is a sufficient downward force exerted on the outer cap while the outer cap is being turned in a counter-clockwise direction.

The user of inner and outer caps in order to provide what is referred to as a type of child-resistant closure is disclosed in U.S. Pat. No. 4,598,833, issued Jul. 8, 1986 to Herr, and by U.S. Pat. No. 5,280,842, issued Jan. 25, 1994 to Koo. The Herr patent discloses a child-resistant, tamper-evident closure having nested inner and outer caps with ratchet teeth on the inner facing skirt walls of the respective caps to cooperate to fasten the closure onto the container, and ratchet teeth on the inner facing top walls of the respective caps for removal of the closure upon simultaneous application of torque and a downward force. The Koo patent discloses a two-piece child-resistant closure which utilizes a ratchet feature to screw on the closure. One feature of this design is a particular ratchet configuration which includes a specific placement of the elements thereof in order to provide negligible reverse torque during undepressed counterclockwise rotation of the outer closure member. In this application, negligible reverse torque is defined as the torque caused by frictional contact of the outer and inner cap members when the undepressed closure is turned in the removal direction and this is insufficient to cause the undesired or accidental removal of the closure from the container.

The top wall of each cap in these two listed references is a solid circular panel as contrasted with an annular ring-shaped top wall which is consistent with the present invention. Further, the ratchet teeth on each cap are arranged in a radiating pattern across the corresponding surface of the top wall. In order to accommodate such a ratchet tooth pattern, the top wall of each cap needs to be of a solid circular shape rather than being of an annular-ring shape. The presence of a solid top wall for each cap results in the use of more material, increased closure weight, and makes the desired ovalizing of the cap a significantly more difficult manipulation. With a solid circular top wall the wall material must deform in some direction if the outer cap is to be radially compressed into an oval shape. This requires more force than what is required with a substantially open top wall. However, since the retrograde removal of the corresponding inner caps of these two references involves ratchet tooth engagement and in one instance simultaneous downward force, ovalizing of the outer cap is not a consideration. Since the Koo closure receives a downward axial force which must be exerted on the top surface of the outer cap in order to remove the inner cap, this would provide another reason for requiring a solid top wall as part of the outer cap.

In contrast, the present invention uses a unique outer cap design with only a partial top wall having an annular-ring shape. The annular ring shape of the top wall portion of the present invention thereby defines and leaves open the center area. The ratchet teeth which are present on the outer cap are disposed on the underside of the partial top wall portion and extend in the direction of the inner cap. The pattern of ratchet teeth on the outer cap is circumferential rather than radial and this permits the center portion of the outer cap to be left open, thereby reducing the weight and the amount of material. The open center portion of the outer cap also simplifies to some extent ovalizing of the outer cap which is the required manipulation in order to be able to remove the inner cap according to one embodiment of the present invention. In the other primary embodiment, the inner cap removal requires downward force and in this configuration, ovalizing is not a concern.

Turning now to caps and closures which incorporate some type of tamper-evident feature, a break-away ring is often employed. For the most part these closure designs use inwardly and upwardly extending tabs such as disclosed in the Herr '833 patent. This style of tabs requires some type of post-forming operation after the cap is initially molded in order to orient the tabs in the desired inward and upward direction. As perceived by Herr, "conventional molding processes are not capable of producing a closure having the preferred tabs extending upwardly and inwardly as described above" (Herr '833 patent, column 5, lines 27–29). Consequently, in a separate operation, the tabs are bent radially inwardly and upwardly, with heat being applied to the tab joints.

It is obviously important to get the tabs oriented in the desired manner as efficiently and as cost effectively as possible. Notwithstanding the descriptions in the Herr '833 patent, U.S. Pat. No. 5,007,545, issued Apr. 16, 1991 to Imbery, Jr., describes a molding method which does not require side action mold parts nor any subsequent forming operations. The sequential molding steps are illustrated in FIGS. 9–13 of the Imbery, Jr. patent.

U.S. Pat. No. 4,997,097, issued Mar. 5, 1991, to Krautkrämer discloses a closure with inwardly and upwardly directed tabs. However, there is no specific mention of the molding process, nor whether a post-forming operation is required to achieve this particular tab orientation. The Krautkrämer patent discloses a design which is otherwise believed to be conventional as to the general style and function of the tabs.

The present invention provides a unique manufacturing method and a unique resulting configuration for a series of upwardly directed tabs. As the inner cap is molded, a circumferential series of tabs are initially formed in a downwardly-extending orientation. However, as the molding process is concluded and the cap is ejected from the mold, the tabs are bent upwardly and tucked inside an annular bead which is integrally formed as part of the sidewall of the inner cap. The annular bead which is actually an offset wall portion holds the bent tabs in this desired configuration, thereby presenting the tabs in an operable orientation so as to provide a tamper-evident feature to the present invention. The tabs are also placed in engagement with axial ribs disposed around the neck finish of the corresponding container on which the cap is used to provide an anti-backoff feature.

Whether the embodiments of the present invention are configured as child-resistant closures, as tamper-evident closures, or as combinations of the two, each of these various configurations includes unique structural features and characteristics which are not found in any of the listed patent references.

SUMMARY OF THE INVENTION

A child-resistant closure for sealing an open-topped container having an external screw thread formed on a neck finish of the container according to one embodiment of the present invention comprises an outer cap having an annular ring top wall portion which defines an open center portion, the outer cap having a surrounding sidewall, and an inner cap having an upper wall and an internally-threaded, surrounding sidewall for engagement with the external screw thread on the neck finish of the container, the outer cap overlying the inner cap and being substantially concentric therewith, an annular ring pattern of ratchet teeth in unitary construction with the annular ring top wall portion and oriented toward the upper wall of the inner cap, the upper wall having formed therein an annular ring pattern of receiving depressions and the ratchet teeth engaging the receiving depressions when the outer cap is turned in a clockwise advancing direction so as to rotate the inner and outer caps together and thereby cause the advancing threaded engagement of the inner cap onto the neck finish, the ratchet teeth sliding over the receiving depressions when the outer cap is turned in a clockwise removal direction, at least one series of axial ribs in unitary construction with the sidewall of the outer cap and oriented toward the sidewall of the inner cap and a plurality of axial ribs in unitary construction with the sidewall of the inner cap and oriented toward the sidewall of the outer cap, whereby ovalizing of the outer cap by oppositely and inwardly directed compressive forces brings a plurality of the axial ribs of the outer cap into the proximity of the axial ribs of the inner cap whereby turning of the outer cap in a counterclockwise removal direction results in axial rib engagement to assist in the removal of the inner cap from the neck finish. This first embodiment may be designed as both a child-resistant and a tamper-evident closures.

In another embodiment of the present invention, the axial ribs on the sidewall of the outer cap are removed and the cooperating ratchet teeth and receiving depressions on the inner and outer caps are modified. The modification includes the addition of a plurality of angled/offset sections on each cap which are able to engage each other once a sufficient level of downward force is applied to the outer cap. This engagement between the outer cap and the inner cap enables removal of the inner cap from the outlet opening of the container.

Either child-resistant closure described above may be made tamper-evident by the configuration which is described below. Further, a tamper-evident closure which is not child-resistant is also contemplated. Accordingly, a tamper-evident closure for sealing an open-topped container having an external screw thread formed on a neck finish of the container according to another embodiment of the present invention comprises a closure cap having an upper wall and an internally-threaded, surrounding sidewall, the sidewall extending downwardly from the upper wall to a lower edge portion, the closure cap further including in unitary construction with the sidewall and with the lower edge portion an annular bead which is downwardly extending below the lower edge portion, and tamper-indicating means comprising a break-away annular ring depending from the lower edge portion of the sidewall, a plurality of frangible elements detachably securing the annular ring to the lower edge portion and a plurality of ratchet tabs bent upwardly, the frangible elements being radially spaced outwardly from the annular bead and defining therewith an annular channel, a portion of the ratchet tabs being positioned within the annular channel whereby the annular bead is used to hold the ratchet tabs in their folded position.

One object of the present invention is to provide an improved child-resistant closure.

Another object of the present invention is to provide an improved tamper-evident closure.

A further object of the present invention is to provide an improved child-resistant, tamper-evident closure.

Related objects and advantages of the present invention will be apparent from the following description.

DESCRIPTION OF THE PREFERRED EMBODIMENT

Figure 1:
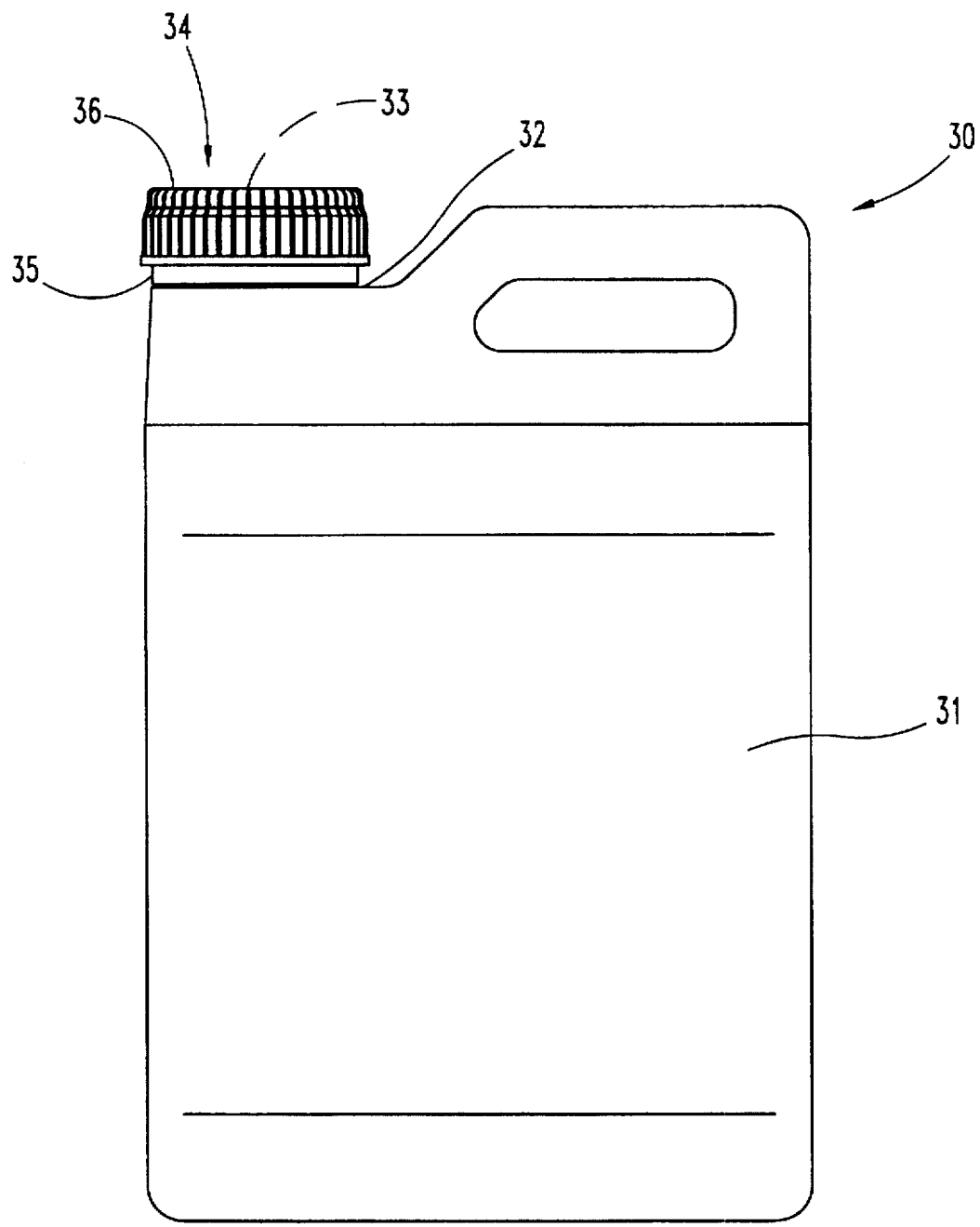
FIG. 1 is a perspective view of a child-resistant, tamper-evident closure as applied to the outlet opening of a container according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a closed container and cap assembly combination 30 according to the present invention. Combination 30 includes a blow-molded plastic container 31 with an externally-threaded and raised neck finish 32. Neck finish 32 provides the outlet opening 33 through which the contents of container 31 pass. In the FIG. 1 illustration, the outlet opening 33 is sealed closed by cap assembly 34. Cap assembly 34 includes an inner cap 35 which provides a tamper-evident capability to the combination and an outer cap 36 which provides a child-resistant feature to the combination. While the child-resistant feature is the result of adding outer cap 36, it should be understood that portions of inner cap 35 are required to cooperate with outer cap 36 in order to achieve the child-resistant capability.

Figure 2:
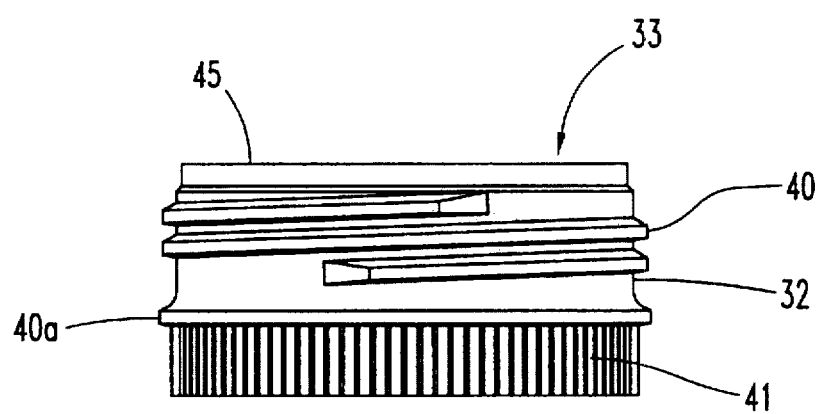
FIG. 2 is a front elevational view of the neck finish of the FIG. 1 container with the closure removed.

The neck finish 32 of container 31 which is illustrated in detail in FIG. 2 includes a series of external threads 40 and a plurality of axial ribs 41 which extend around the outer circumference of the neck finish 32 below the external threads 40. The neck finish 32 is substantially cylindrical and of unitary construction with the remainder of the blow-mold container. Disposed between threads 40 and axial ribs 41 is a retaining lip 40a which serves to retain the tamper-evident ring on the container neck finish once this ring breaks free from the remainder of the inner cap 35. Lip 40a also provides the abutment surface which prevents axial movement of the tamper-evident ring as the inner cap is unscrewed. As a result of this abutment the tamper-evident ring is severed from the remainder of the inner cap 35.

Figure 3:
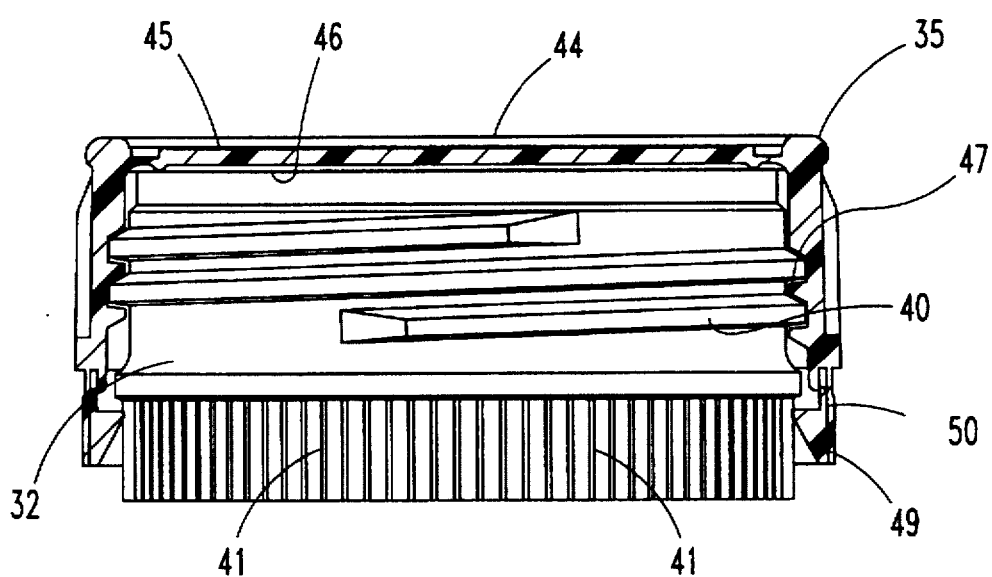
FIG. 3 is a front elevational view of the FIG. 2 neck finish with a tamper-evident inner cap applied, the cap being illustrated as a full cross-sectional view.

Referring to FIG. 3 the inner cap 35 is illustrated as threadedly assembled onto the neck finish 32. The internally threaded inner cap 35 engages the externally-threaded neck finish in the conventional manner with the upper wall 44 of the inner cap 35 sealing against the upper edge 45 of outlet opening 33. An optional liner 46 is illustrated as being positioned against the inner surface of the upper or top end wall 44. The liner 46 seals against the upper edge 45 with the requisite sealing force being provided by the threaded engagement and manual tightening of internal threads 47 of the inner cap 35 onto the neck finish 32. As would be understood for the normal or conventional threaded engagement, inner cap 35 advances onto neck finish 32 with clockwise rotation and is able to be removed from the neck finish with counterclockwise rotation.

As will be described in greater detail hereinafter, a circumferential series of ratchet-like tabs 49 are provided as part of inner cap 35. These tabs are part of a break-away ring 50 which provides the tamper-evident capability to the present invention. The tabs 49 (see FIG. 7) are styled in a way so as to provide two separate capabilities to the present invention. The tabs are illustrated in their folded orientation in FIG. 8. Each tab 49 has a wedge-like shape in the axial direction and the wedge-like shape is oriented with a radially-thinner section 49a positioned at the lower edge of the break-away ring 50 where the tabs 49 are hinged and extend upwardly therefrom to a radially-thicker section 49b. A substantially horizontal surface 40c provides the abutment surface against the under side of annular lip 40a. As should be understood, the folded tabs 49 are able to radially deflect in an outward direction so as to pass over lip 40a with advancing threaded engagement of inner cap 35 onto neck finish 32. However, any attempt to remove inner cap 35 causes surface 40c of each tab 49 to be drawn upwardly into contact with lip 40a. This abutment ultimately results in separation of the break-away ring 50 from the remainder of the inner cap. The lip 40a then serves to retain the ring 50 on the neck finish.

Each tab 49 also includes a ratchet-like projection 49d (see FIG. 9) which has a triangular shape, an inclined surface 49e and a lip extension 49f. The projections 49d engage axial ribs 41 in a ratchet-like manner such that the inner cap can be advanced onto the neck finish with the tabs riding over the axial ribs 41. Once the inner cap is fully engaged on the neck finish, the projections interlock with the axial ribs 41 in order to prevent any back off of the inner cap from the neck finish due to vibrations and movements which can occur during shipping and handling. While the interlock may also contribute to some extent to the tamper-evident capability, that is not the primary function of the projection 49d and rib 41 interlock.

Increasing the force level of the retrograde rotation in a counterclockwise direction will ultimately cause the tamper-evident, break-away ring 50 to sever from the remainder of the inner cap 35 by the fracture of connecting frangible elements 51. Once the frangible elements 51 break free, lip 40a helps to keep the ring 50 retained on the neck finish so that this loose ring cannot fall or dislodge into an unacceptable location such as into the receptacle where the contents of container 31 are being poured. By means of the break-away ring 50, there is a visual indication provided to the end user as to whether a newly filled and closed container has been opened after a new tamper-evident inner cap is applied. Any attempt to tamper with the container and its contents will be evidenced by breakage of the frangible elements 51. If the break-away ring 50 is severed from the remainder of the inner cap 35, the end user is immediately alerted and can proceed accordingly to either test the contents of the container for contamination or simply not use the contents and select instead an unopened container.

Figure 10:
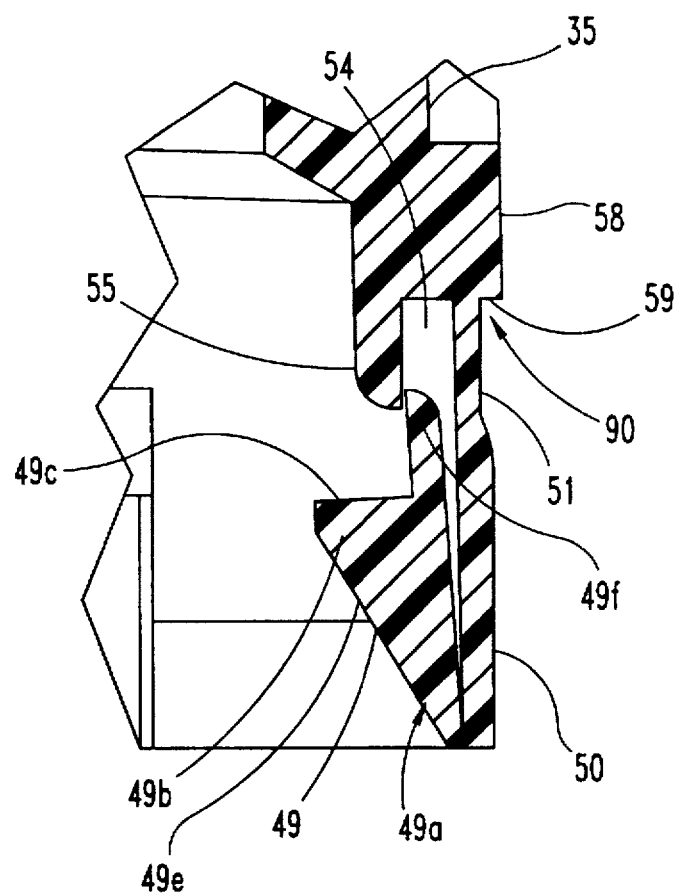
FIG. 10 is an enlarged, partial section view of the FIG. 8 inner cap according to the present invention.

Referring now to FIGS. 4–7, the inner cap 35 is illustrated as it appears in an initially molded configuration with the ratchet-like tabs 49 in a downwardly extending orientation. This is the orientation which results from the mold arrangement in the initial stages of the process. In the later stages of the molding process, the tabs are bent upwardly and tucked into a locked position within an annular channel 54 and behind an annular bead 55, as illustrated in FIG. 10. Lip extension 49f provides the means of achieving a locked position behind annular bead 55.

Figure 4:
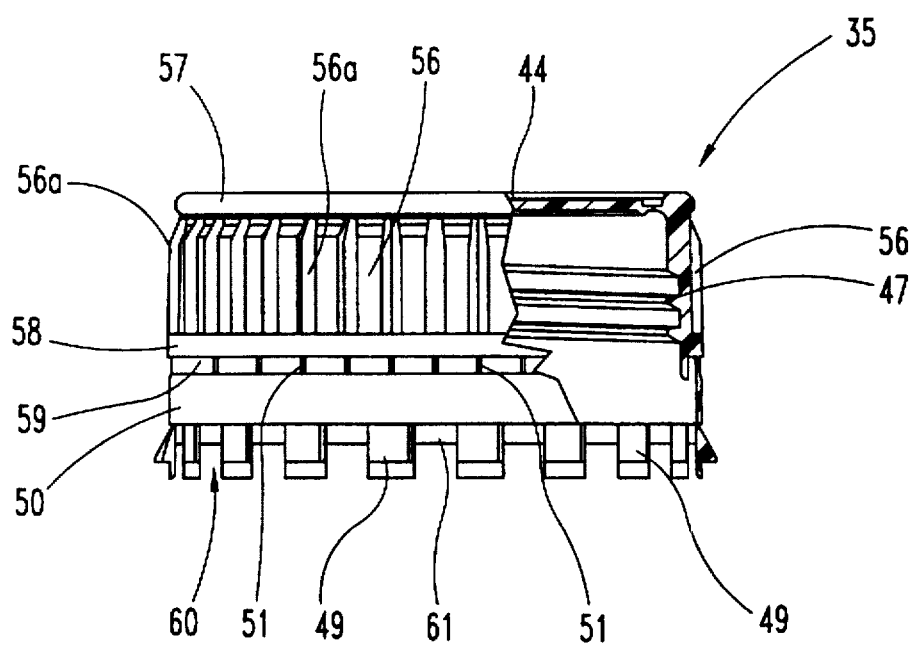
FIG. 4 is a front elevational view in partial section of the FIG. 3 inner cap comprising a portion of the FIG. 1 closure according to the present invention with its interlocking tabs in a downward direction.

Referring specifically to FIG. 4, inner cap 35 includes a substantially cylindrical outer sidewall 56 including a circumferential series of evenly-spaced, raised axial ribs 56a which extend between top rim 57 and lower edge 58. Sidewall 56 is internally threaded for threaded engagement with the external threads 40 disposed on the neck finish 32. The underside 59 of lower edge 58 is initially connected to break-away ring 50 by the frangible elements 51. The ratchet-like tabs 49 extend downwardly from the lower edge of ring 50 and are interconnected to each other by a connecting membrane 60 which extends between adjacent tabs as individual membrane sections 61. Inner cap 35 is a unitary, all-plastic member, except for the optional liner 46, which is a separately fabricated member and is made out of a suitable cap liner material such as either aluminum-backed pulp or foam polyetheylene.

Figure 5:
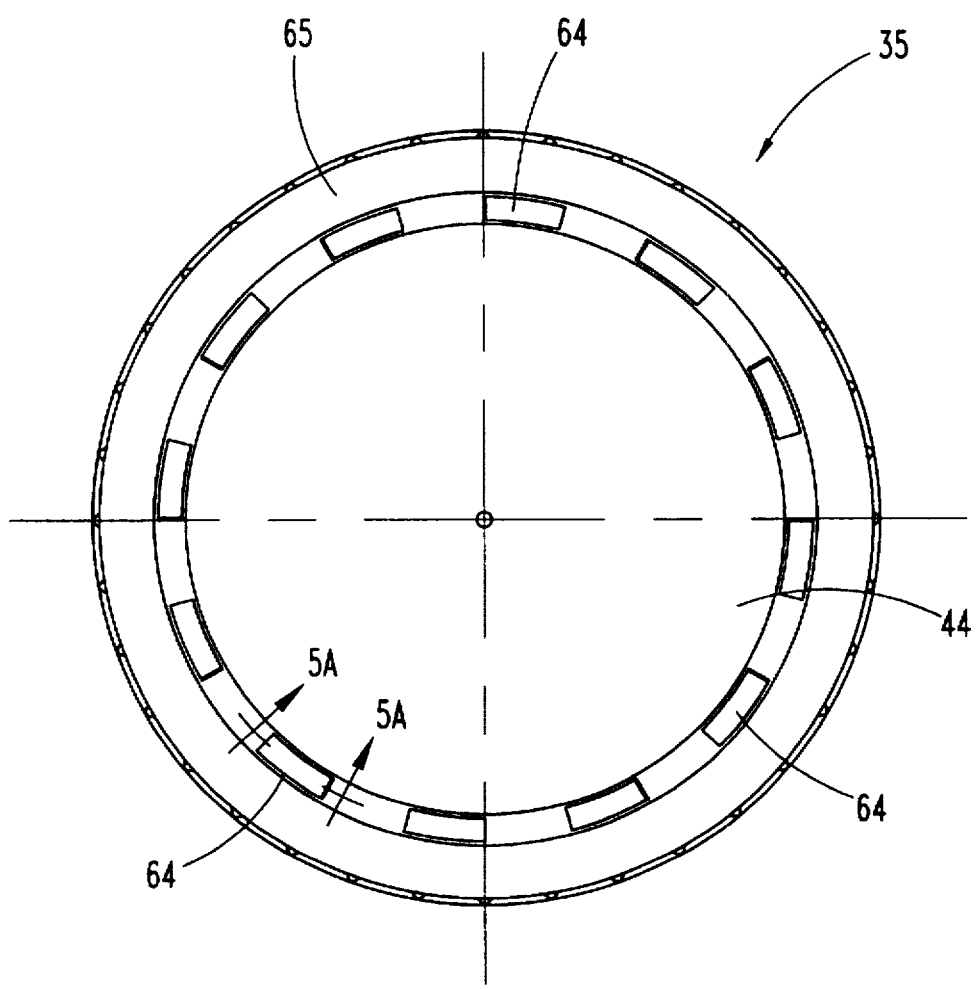
FIG. 5 is a top plan view of the FIG. 4 inner cap.
Figure 5A:
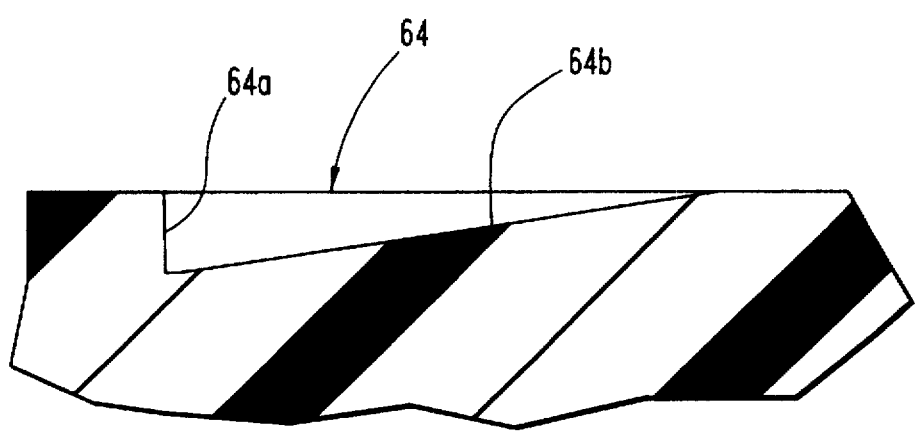
FIG. 5A is an enlarged detail of a receiving depression located in the top surface of the FIG. 4 inner cap as viewed in the direction of line 5A-5A in FIG. 5.

Inner cap 35 provides one portion of a two-cap assembly which provides a child-resistant feature. In order to provide this feature, ratchet tooth engagement is employed with an annular series of receiving depressions 64 being molded down into the upper surface 65 of the inner cap 35 (see FIG. 5). Each depression includes an axial wall 64a and an inclined ramp portion 64b (see FIG. 5A). This design permits free counterclockwise rotation of the outer cap due to the orientation of its ratchet teeth. However, any clockwise rotation to try and advance the inner cap onto the neck finish results in ratchet tooth abutment up against axial walls 64a. It should be understood that the outer cap 36 has a slight axial preload onto inner cap 35 due to the snap fit assembly between the two caps as will be described. This slight preload actually forces the ratchet teeth up against the receiving depressions 64 and upper surface 65. Consequently, while the outer cap is free to rotate in a counterclockwise direction, there is slight friction between the two due to the preload.

Figure 6:
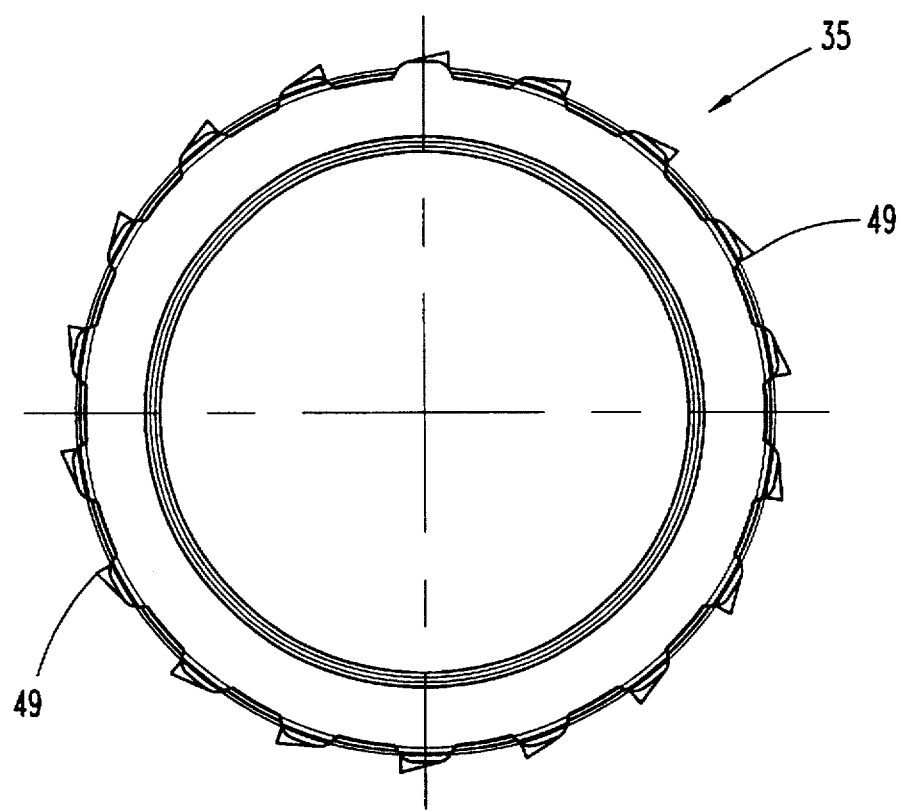
FIG. 6 is a bottom plan view of the FIG. 4 inner cap.
Figure 7:
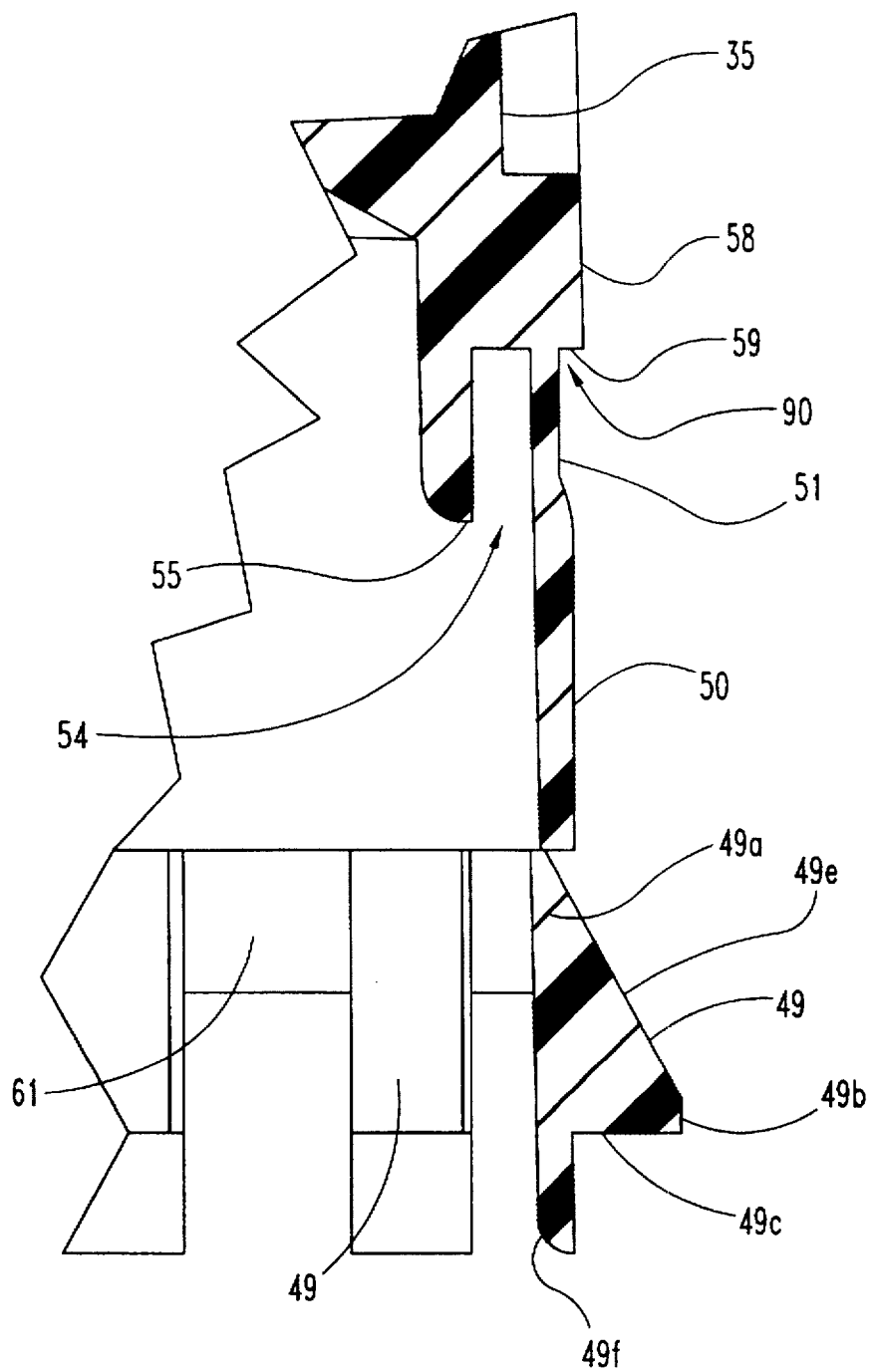
FIG. 7 is an enlarged, partial section view of the FIG. 4 inner cap according to the present invention.
Figure 8:
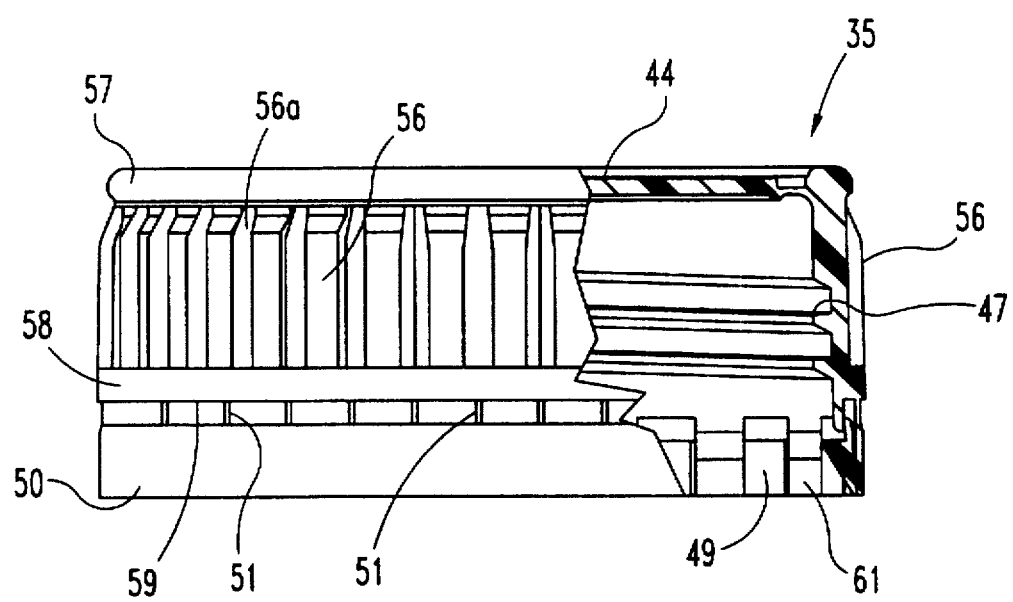
FIG. 8 is a front elevational view in partial section of the FIG. 4 inner cap with the interlocking tabs folded upwardly and locked in position behind an annular bead which is formed on the interior of the inner cap.
Figure 9:
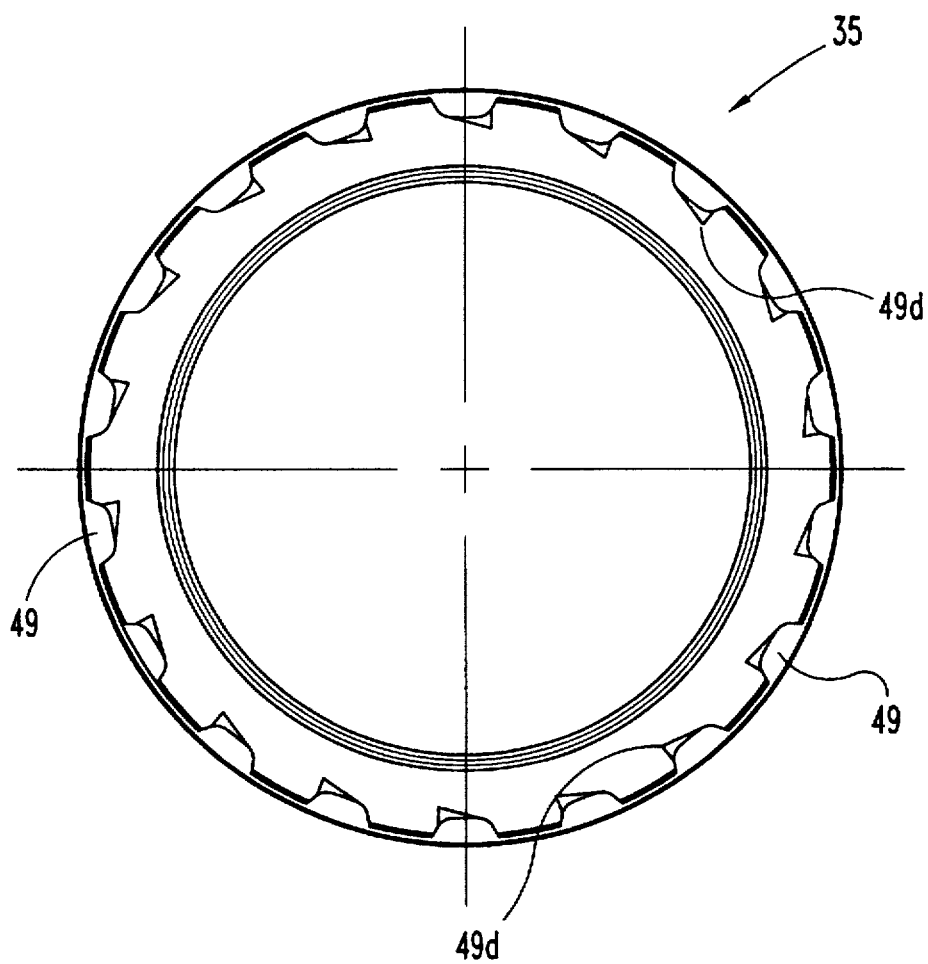
FIG. 9 is a bottom plan view of the FIG. 8 inner cap.

In FIG. 7 the enlarged details of the tabs 49, annular channel 54, annular bead 55, and membrane sections 61 are illustrated. The final orientation of the folded tabs 49 is illustrated in FIG. 10. In FIGS. 8 and 9, the inner cap is illustrated once the tabs are folded into the annular channel 54 behind annular bead 55. While FIGS. 4 and 8 are for the most part similar to each other, the lower portion as illustrated in FIG. 8 is different due to the fact that the tabs are now folded upwardly and disposed in a locked position. Accordingly, FIGS. 6 and 9 are similar to each other as are FIGS. 7 and 10. It will be noted that the top plan view does not change as the folding of the tabs 49 has no visual effect on the top plan view.

It is to be understood that the child-resistant feature of the present invention is provided by the ratchet tooth and depression 64 engagement. Therefore, elimination of the outer cap 36 will eliminate the child-resistant aspect of the present invention. This means that the same inner cap design can be used with or without the child-resistant capability. To convert the inner cap 35 into a child-resistant combination, the outer cap 36 is simply pressed down over the inner cap in a substantially concentric manner and then snapped into position with a slight preload, as previously mentioned. Thereafter, the interaction of the ratchet teeth on the inside surface of the top wall of the outer cap with the receiving depressions 64 on the upper surface of the inner cap means that the outer cap is able to turn without engagement in the counterclockwise direction. Consequently, any attempt to unscrew the inner cap by way of ratchet engagement is not possible. However, ratchet tooth and depression engagement is effective to advance the inner cap 35 onto the neck finish 32 by means of advancing rotation of the outer cap 36.

Referring now to FIGS. 11–14, the details of the outer cap 36 are illustrated. Outer cap 36 is a unitary, molded plastic cap of a substantially cylindrical shape with an annular top wall 70. The circular center portion 71 of the top wall 70 is open, leaving an annular ring portion 72 extending radially inwardly from sidewall 73. The underside surface 74 of portion 72 includes a circumferential series of ratchet teeth 75 which are shaped, oriented, and positioned so as to be in alignment with the circumferential pattern of receiving depressions 64 in the upper surface 65 of upper wall 44 of inner cap 35.

Figure 11:
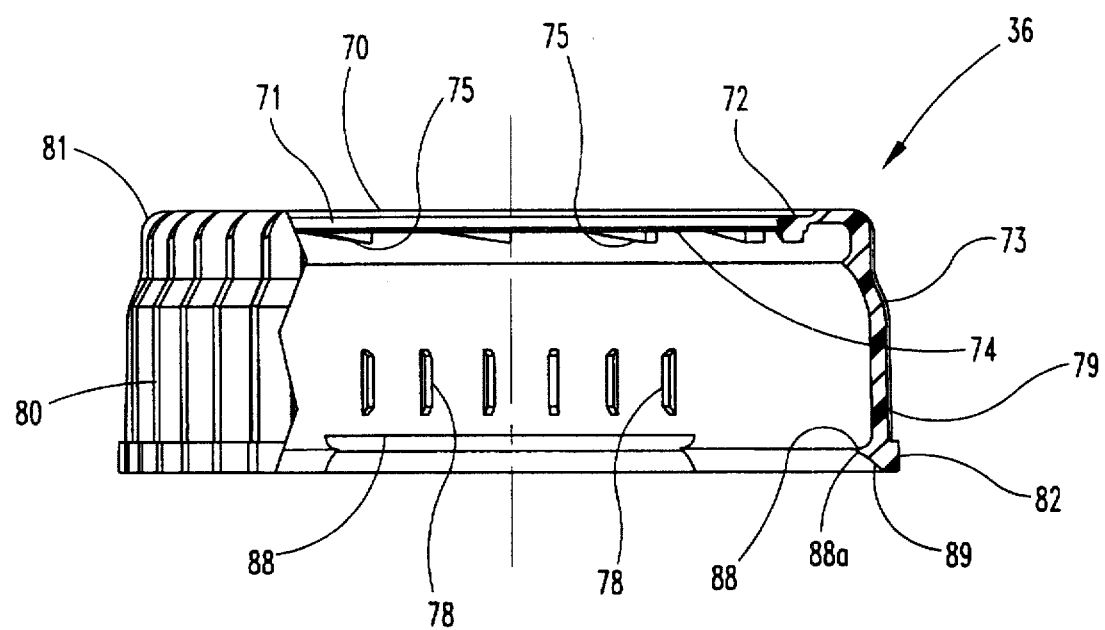
FIG. 11 is a front elevational view in partial section of an outer cap comprising a portion of the FIG. 1 closure according to the present invention.
Figure 12:
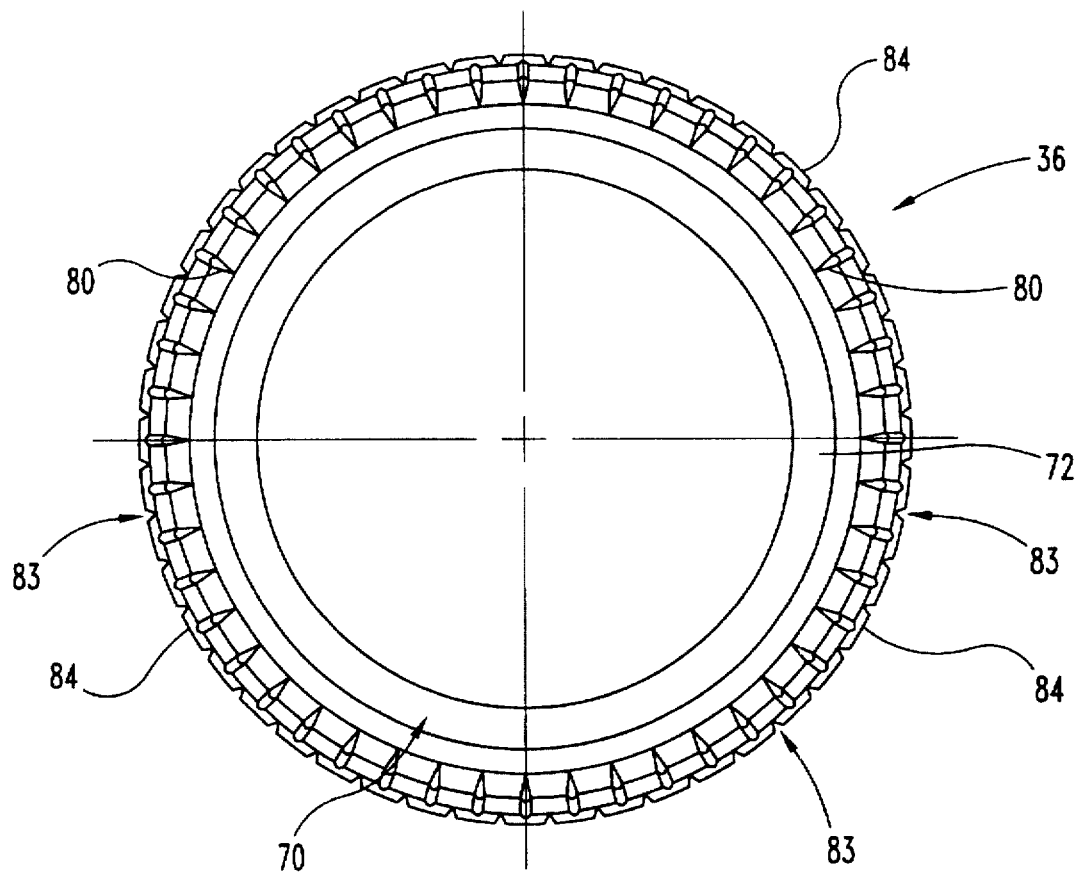
FIG. 12 is a top plan view of the FIG. 11 outer cap.
Figure 13:
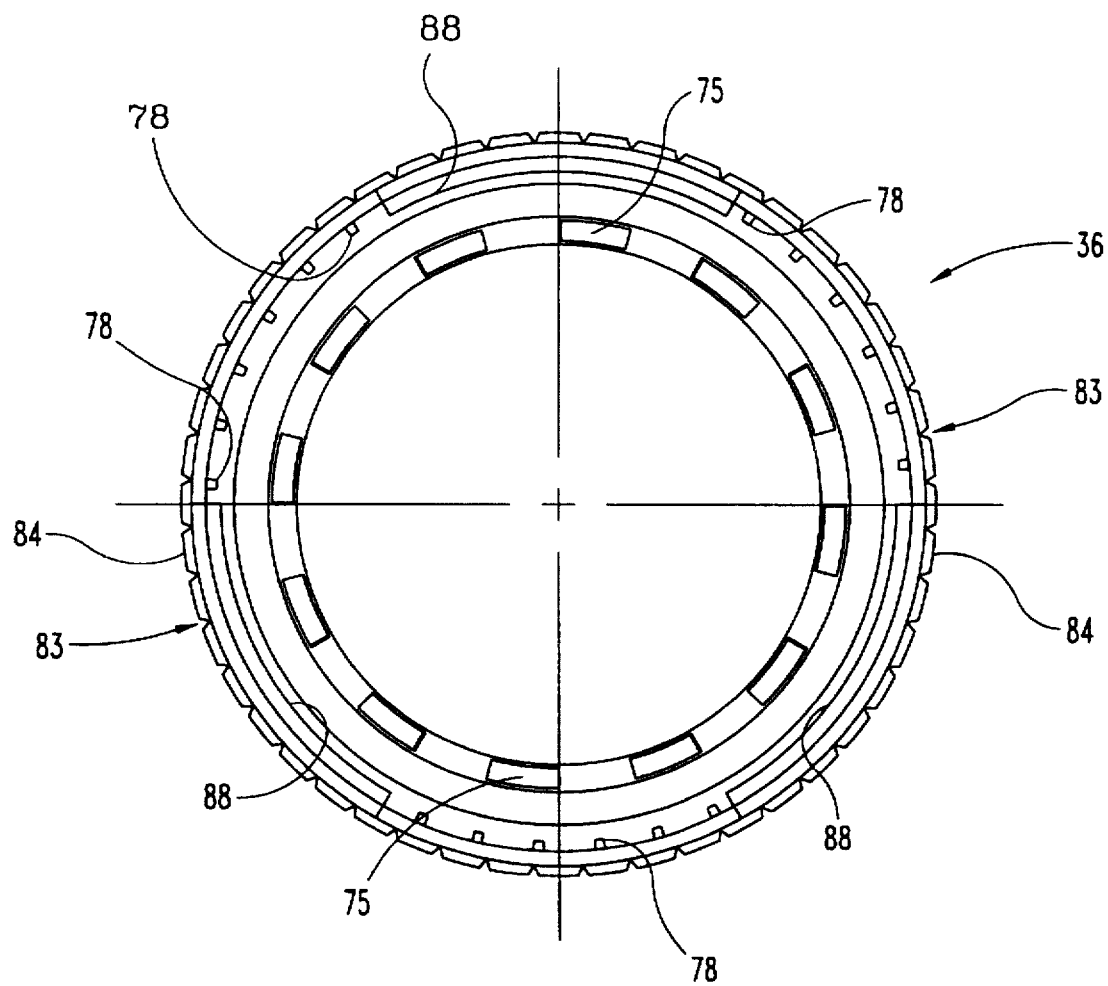
FIG. 13 is a bottom plan view of the FIG. 11 outer cap.

The partial section view of FIG. 11 illustrates the triangular shape of ratchet teeth 75. The teeth which are illustrated are on the rear or back side of ring portion 72 as the front side is removed for the partial section illustration. This understanding is important to be able to appreciate that the outer cap 36 rotates without ratchet engagement relative to depressions 64 in a counterclockwise direction and with ratchet engagement when rotated in a clockwise direction. Consequently, any attempt to remove the inner cap by means of ratchet engagement with the outer cap will not be successful. Turning of the outer cap is representative of the type of effort a child would perform in trying to open the container. Since the inner cap is not loosened by simply counterclockwise turning of the outer cap, the container and cap assembly combination of the present invention is made child-resistant.

While there is a way to remove the inner cap 35 by way of the outer cap 36 and thereby open the container 31, the manual manipulations which are required to perform this task are not able to be performed by children. Due in part to hand size limitations and due in part to strength limitations, the required opening procedure is something which children cannot normally perform. While the age of the child is a consideration, the older the child, presumably the more mature and the risks of improper opening are less.

In order to remove the inner cap 35 and thereby open the container, the sidewall 73 of the outer cap 36 is compressed by the manual application of inwardly directed compressive forces which are substantially 180 degrees apart on the sidewall of the outer cap. This form of cap compression ovalizes the sidewall and, as a result, places two oppositely-disposed portions of the sidewall 73 in contact or at least close proximity with the outer wall of the inner cap 35 and more specifically in close proximity with axial ribs 56.

While high frictional forces in a radial direction between contacting surfaces of the inner and outer caps can be sufficient to remove the inner cap 35, there is additional assistance provided by three spaced-apart series of axial ribs 78 which are formed on the inside surface of the sidewall of the outer cap. Each of these three series includes six axial ribs and each series extends circumferentially for approximately 60 degrees. Further, each of these three series are separated by approximately 60 degrees of open wall area. As the axial ribs 78 are compressed into closer proximity to axial ribs 56 on the inner cap 35, some rib-to-rib interfit will normally occur thereby enabling rib-to-rib engagement in a circumferential direction, thereby facilitating the effort to remove the inner cap. While this rib engagement is not ratchet tooth engagement because it is not unidirectional in nature, it is still helpful and lessens to some degree the extent of compressive forces which are required in order to obtain sufficient frictional contact for inner cap 35 to be removed by the counterclockwise rotation of outer cap 36. It is not necessary to position the sidewall compressive forces at specific locations relative to the three series of axial ribs 78. The fact that there are three series 60 degrees apart is sufficient to put at least a few of the ribs into engagement. The annular ring shape of top wall 70 which creates open center portion 71 makes the ovalizing of sidewall 73 somewhat easier as compared to a cap with a solid (covered) center portion.

The outer surface 79 of sidewall 73 includes a circumferential series of slightly raised, relatively thin axial ribs 80 which extend from top edge 81 to bottom rib 82. Rim 82 is notched with a uniformly-spaced series of V-shaped notches 83. The V-shaped notches 83 create uniformly spaced rim portions 84. The axial ribs 80 are oriented relative to the rim portions 84 such that each rib intersects a corresponding rim portion in its approximate center. Consequently, each V-shaped notch is located at the approximate midpoint between adjacent axial ribs 80. The addition of notches 83 serves to relieve the compressive forces so that the outer cap 36 is easier to ovalize for removal of the inner cap. The notches provide a place for the material to go as ovalizing occurs.

Figure 14:
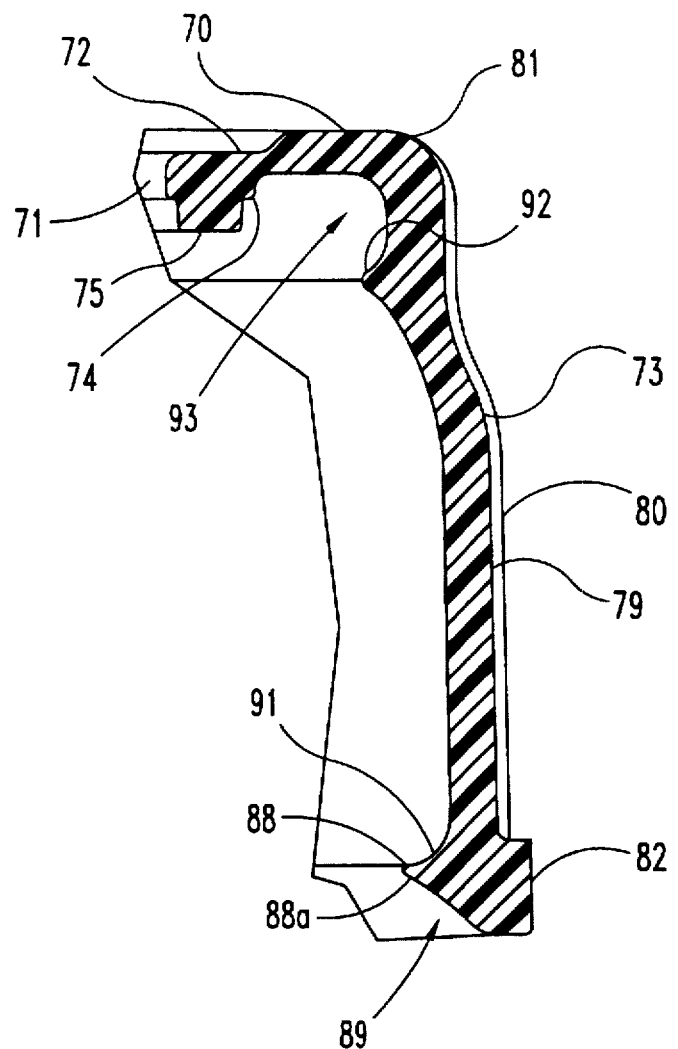
FIG. 14 is an enlarged partial section view of one portion of the FIG. 11 outer cap.

As previously mentioned, outer cap 36 is designed with a size and shape to fit down over and around inner cap 35 in a substantially concentric manner. Slight radial clearance is designed into the sizes of the respective caps so as to enable the outer cap 36 to rotate in a counterclockwise direction relative to the inner cap 35, noting the preload between the two caps and the slight frictional interference which is created. In order to securely hold the outer cap onto the inner cap in the axial direction once the outer cap is applied, three radially- inward lips 88 are positioned on the inside surface 89 of bottom rim 82. Each lip 88 has a substantially triangular shape as is illustrated in FIG. 14 and extends circumferentially for approximately 60 degrees. The three lips 88 are equally spaced apart and each one is positioned in between adjacent series of axial ribs 78. The axial height of outer cap 36 relative to inner cap 35 is such that the three lips 88 are positioned below lower edge 58 of the inner cap 35. The upwardly inclined lower surface 88a of each lip 88 enables the outer cap to slide more easily over lower edge 58 before snapping into final position. It should be noted at this point that the frangible elements 51 are inset slightly in a radially inward direction, thereby leaving a slight recess 90 below lower edge 58. This recess 90 is engaged by the upper surface 91 of each lip 88.

Figure 17:
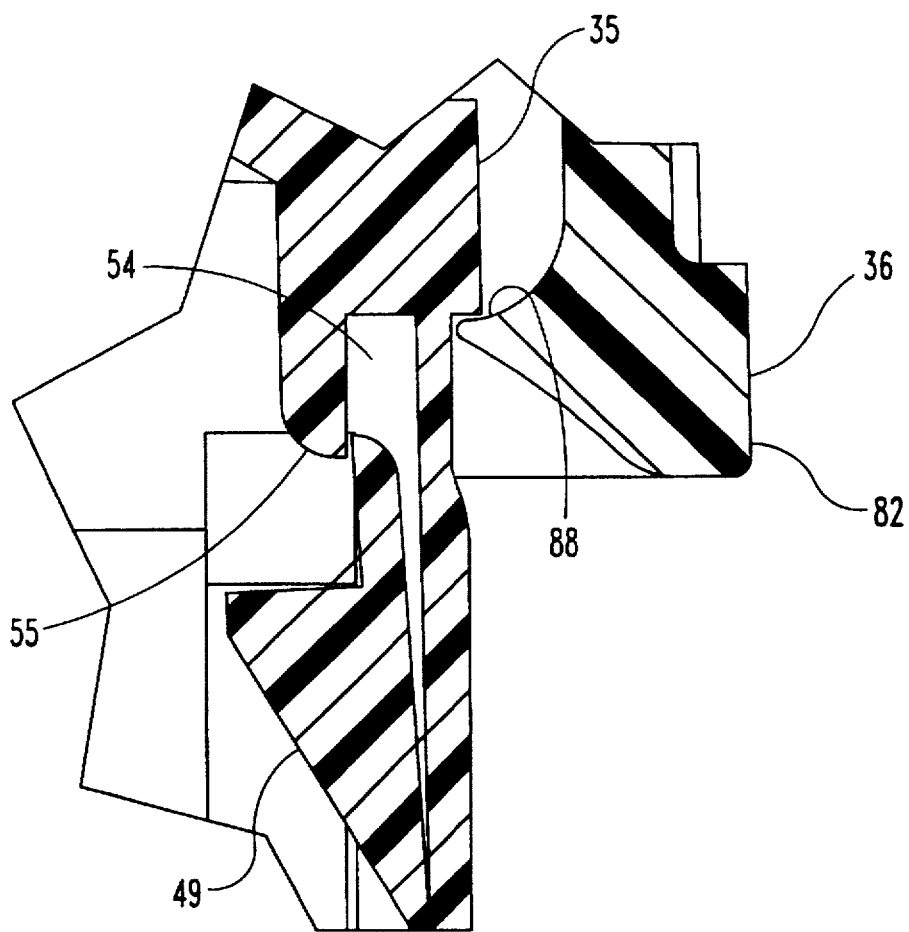
FIG. 17 is an enlarged detail in full section of the lower, outer portion of the FIG. 8 and FIG. 15 caps showing another area of engagement between the inner and outer caps.

This style of cap engagement is illustrated in FIG. 17 and it is clear from this drawing figure that the frangible elements 51 can be severed from the lower edge 58 for separation of the break-away ring 50 without affecting the snap-fit engagement of lips 88 within recess 90 below lower edge 58. This particular configuration means that the inner cap 35 can be configured without the tamper-evident feature and yet still receive the outer cap for creating a child-resistant closure. It is also a fact that even if the inner cap is initially designed as a tamper-evident cap, once the container is initially opened and the tamper-evident ring breaks away from the remainder of the cap, the cap can still retain its child-resistant capabilities.

Figure 15:
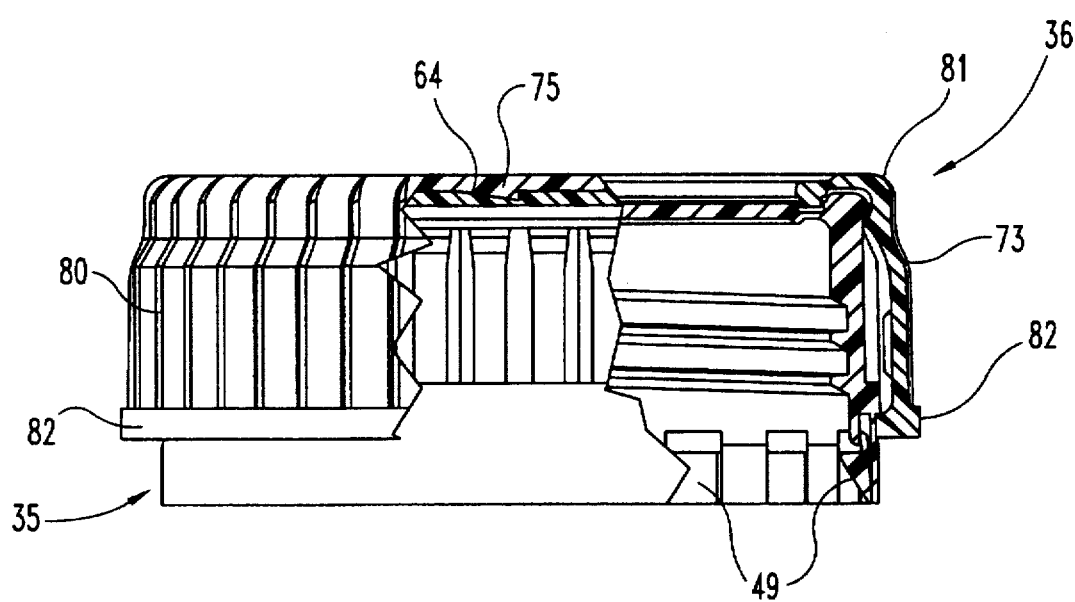
FIG. 15 is a front elevational view in partial section of the FIG. 11 outer cap snapped into position over the FIG. 8 inner cap in accord with the present invention.
Figure 16:
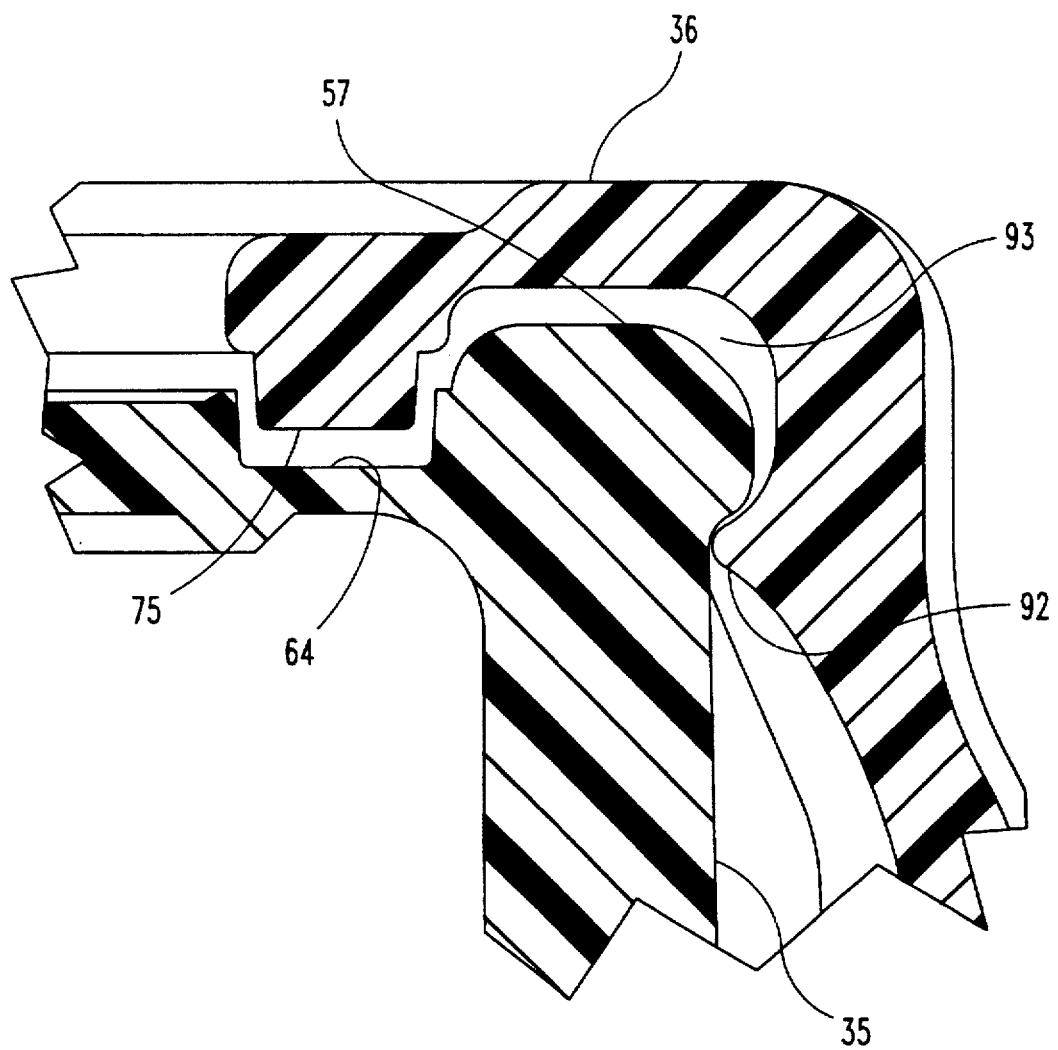
FIG. 16 is an enlarged detail in full section of the upper, outer corner of the FIG. 8 and FIG. 15 caps showing one area of engagement between the inner and outer caps.

Referring to FIGS. 15-17, the engagement between outer cap 36 and inner cap 35 is illustrated. Included are two enlarged detail views which illustrate the engagement of lips 88 and a second location of engagement by outer cap 36 around top rim 57. Radially inward upper lip 92 is circumferential and extends below top rim 57. The combination of lip 92, top wall 70 and the top edge 81 connecting portion therebetween creates and defines an annular pocket 93 into which the annular top rim 57 is received. The top rim 57 has a curved outer contour in lateral section which approximates the lateral shape of pocket 93. Also illustrated in FIG. 16 is the positioning of one ratchet tooth 75 down into one of the receiving depressions 64. The engagement of upper lip 92 below top rim 57 also serves to axially secure the outer cap 36 to the inner cap 35 and to radially position the two caps relative to each other. Since the series of three lips 88 and annular lip 92 both serve to axially position and secure the outer cap 36 onto the inner cap 35, each location can be thought of as either the primary or the secondary location of axial engagement between the two caps.

Figure 18:
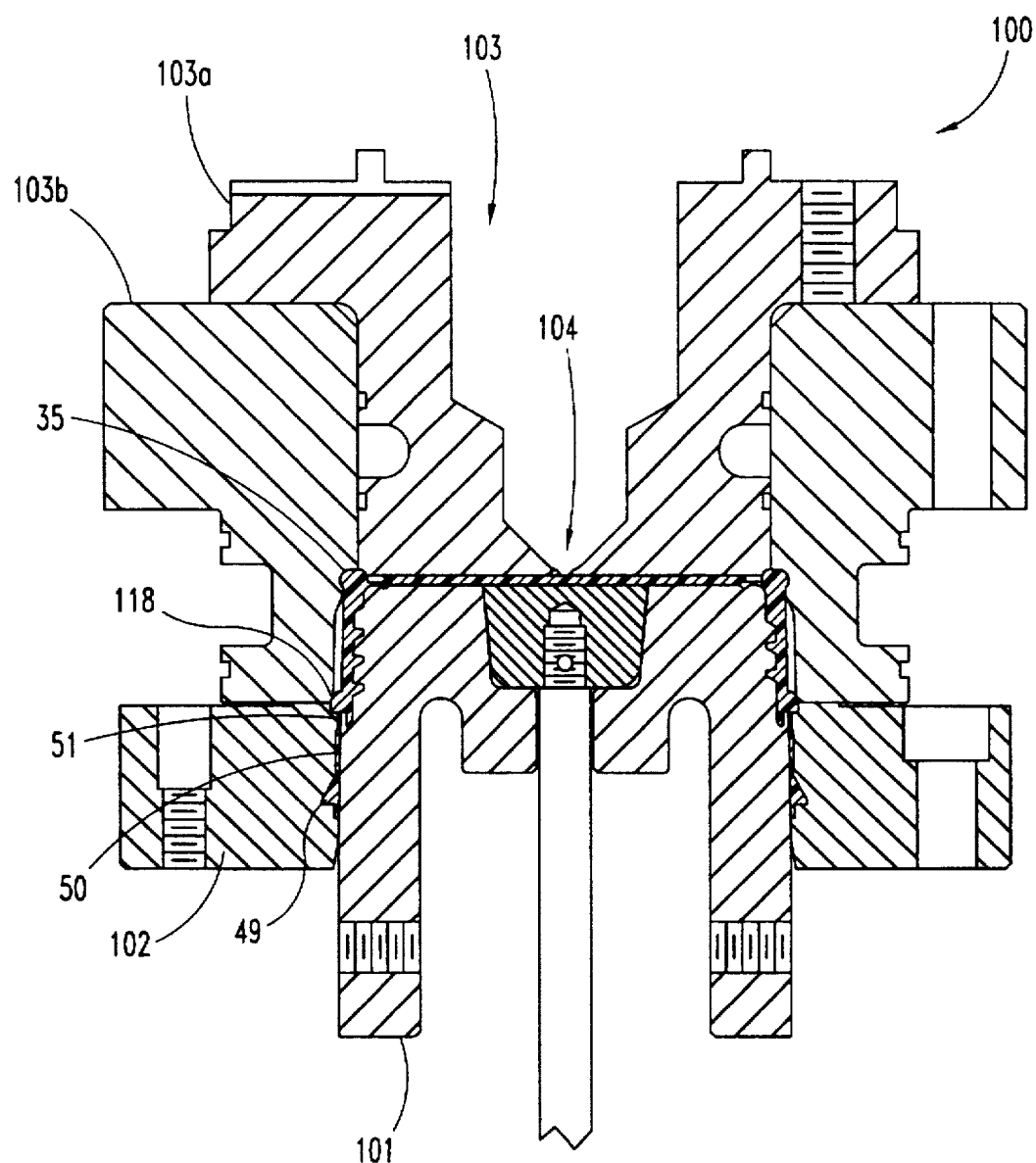
FIG. 18 is a partial, front elevational view in full section of the mold arrangement utilized for the injection molding of the FIG. 4 inner cap.

Referring to FIG. 18, the mold arrangement 100 used for manufacturing the inner cap 35 of the present invention is illustrated. While there are a number of mold components, the primary focus is on the inner core 101 and outer ring 102 which cooperate to provide the required mold cavity for the frangible elements 51, break-away ring 50 and the ratchet-like tabs 49. The top portion 103 of the mold arrangement 100 includes an inner section 103a and a cooperating outer section 103b. The arrangement and location of the parting line between these two sections enables the top portion to be separated and removed from the molded inner cap 35. The combination of sections 103a and 103b creates a substantially cylindrical, cup-shaped member which includes nozzle 104 for the introduction of molten plastic into the mold cavity. Nozzle 104 is centrally positioned in inner section 103a.

Figure 19:
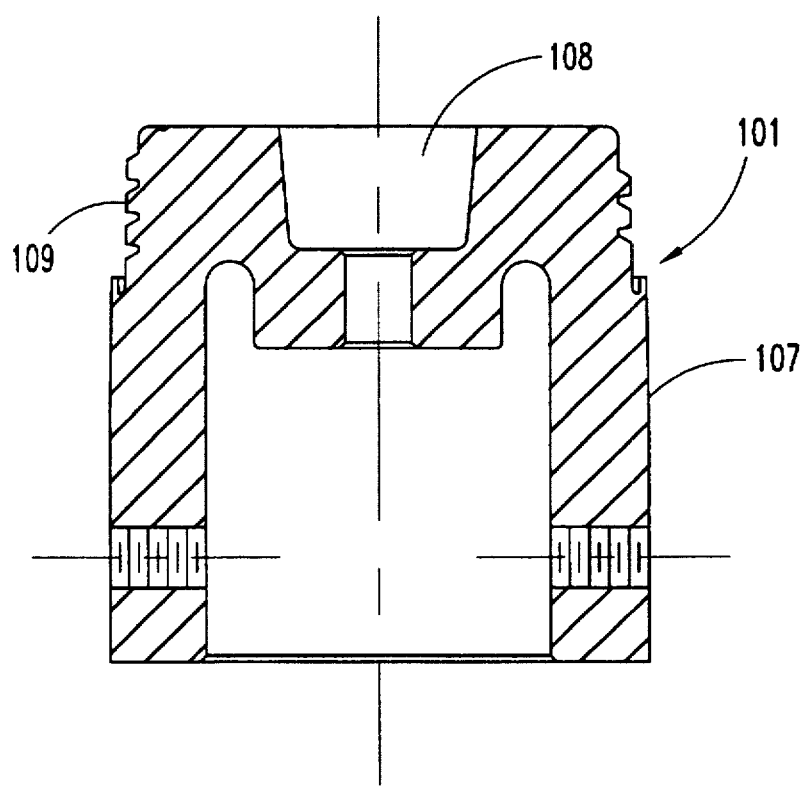
FIG. 19 is a front elevational view in full section of the inner core which comprises a portion of the FIG. 18 mold arrangement.
Figure 20:
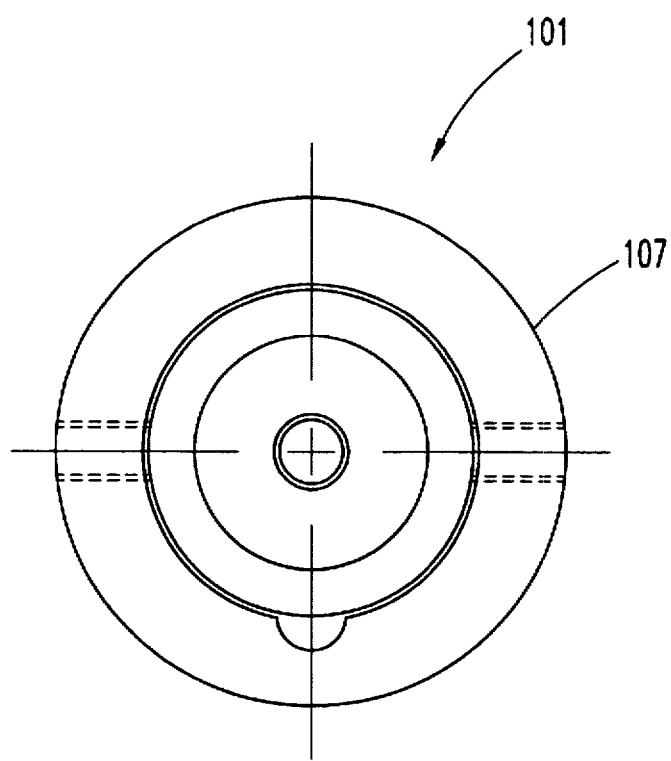
FIG. 20 is a bottom plan view of the FIG. 19 inner core.

The inner core 101 is illustrated in greater detail in FIGS. 19 and 20 where FIG. 19 is a front elevational view in full section and FIG. 20 is a bottom plan view. The inner core 101 in cooperation with top portion 103 defines a mold cavity for the upper portion of the inner cap. In particular, the inner core 101 is contoured so as to create a mold cavity for internal threads 47, upper wall 44, side wall 56 and axial ribs 56a. As illustrated in FIGS. 19 and 20, the inner core 101 includes a substantially cylindrical body 107, a center aperture 108 and a thread portion 109.

Figure 21:
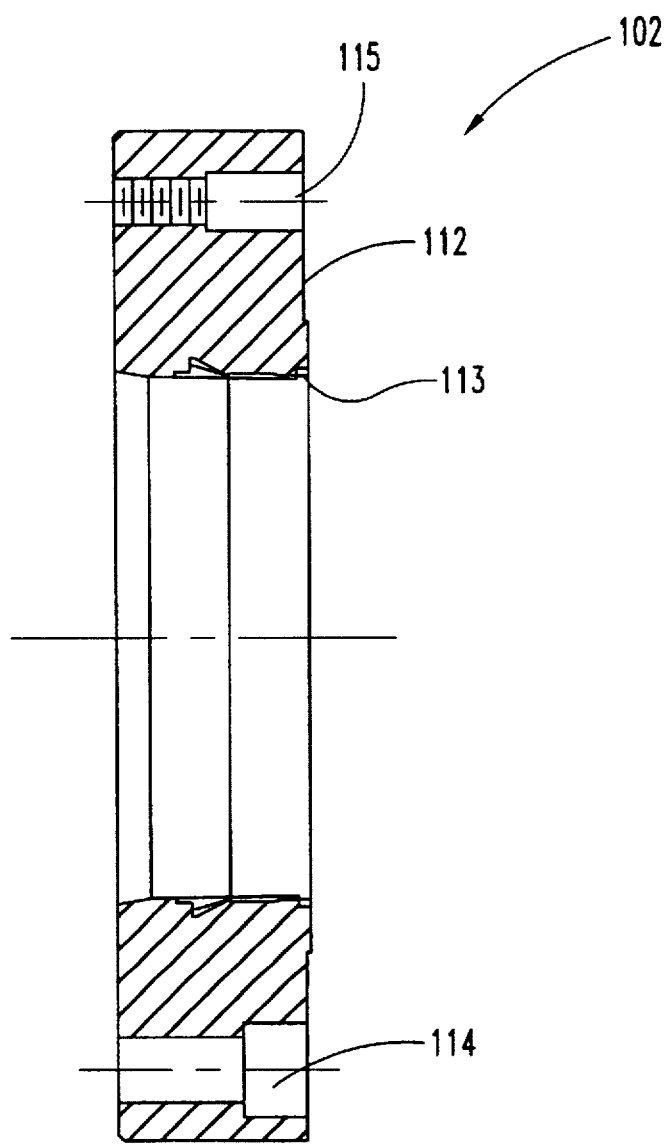
FIG. 21 is a front elevational view in full section of the outer ring which comprises a portion of the FIG. 18 mold arrangement.
Figure 22:
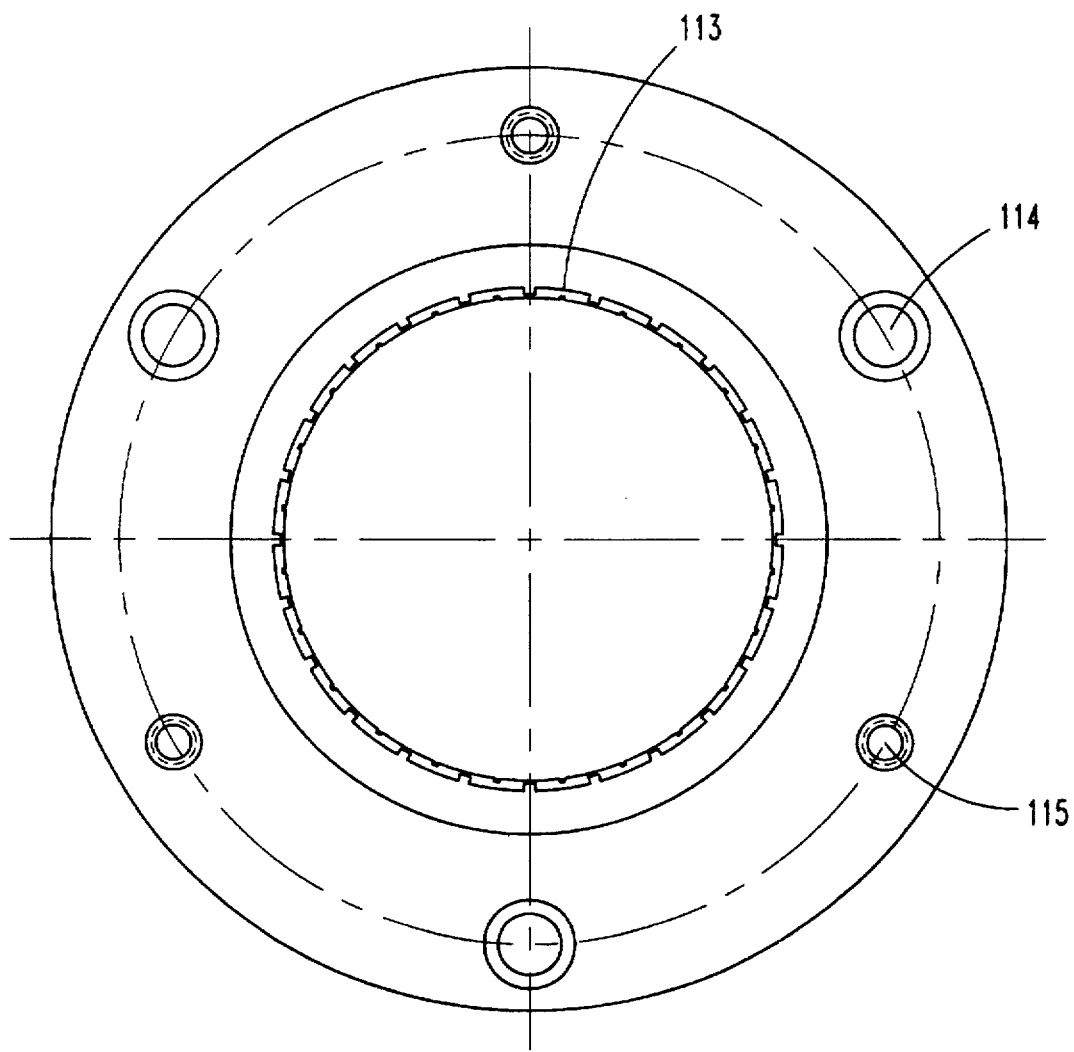
FIG. 22 is a top plan view of the FIG. 21 outer ring.
Figure 23:
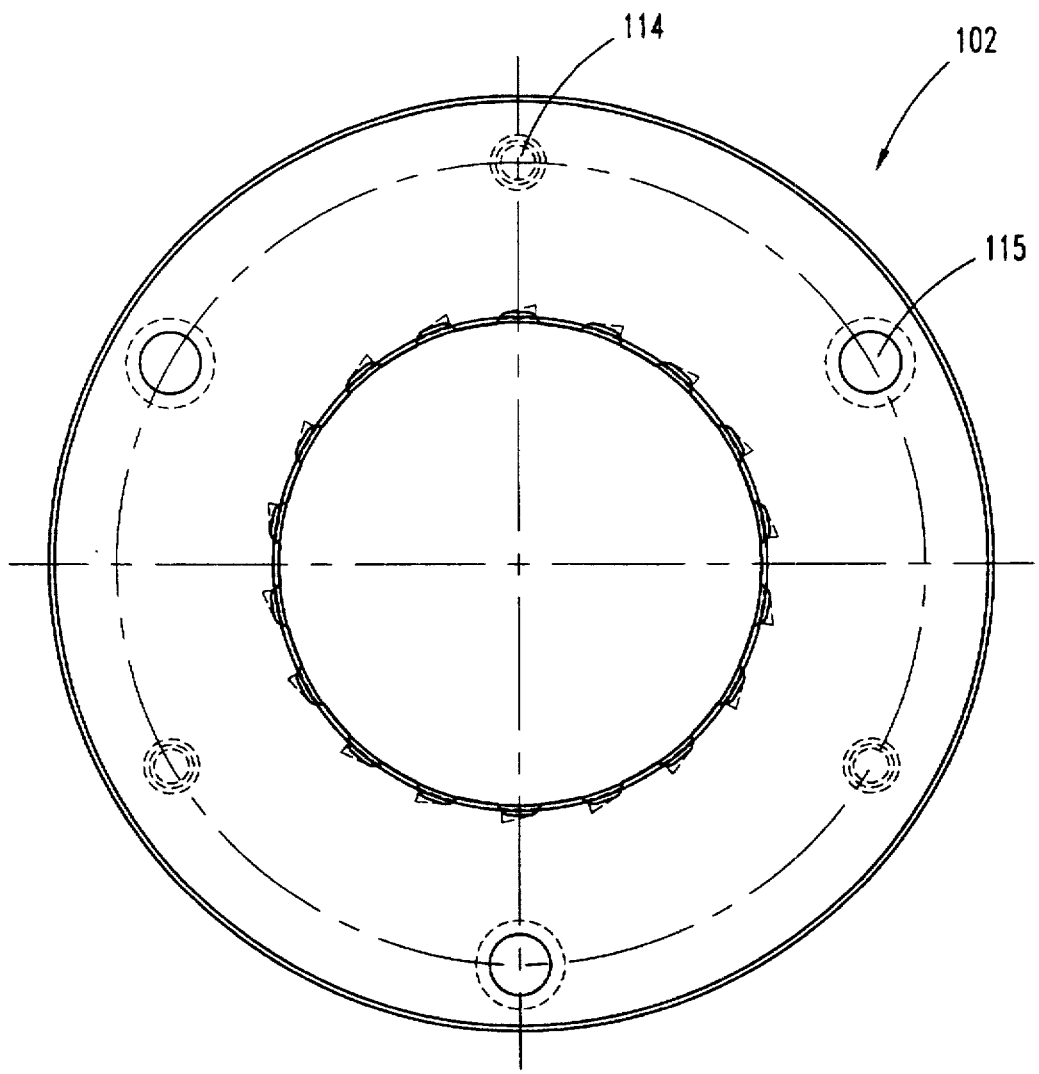
FIG. 23 is a bottom plan view of the FIG. 21 outer ring.

Referring to FIGS. 21, 22 and 23 the substantially cylindrical outer ring 102 is illustrated in greater detail. The full section view of FIG. 21 accurately details the outer ring including the interior shaping and contouring which creates the mold cavity for the frangible elements 51, ring 50 and tabs 49. The top plan view of FIG. 22 and the bottom plan view of FIG. 23 complete the detailing of the outer ring 102. The outer ring is a unitary member which moves axially into and out of its molding orientation. Due to the design of the inner core 101 and outer ring 102, and by factoring into the mold design the anticipated shrinkage of the molded plastic, the design of the outer ring 102 can be made as a unitary member. A unitary design avoids the need for a split block mold thereby avoiding the requirement for more expensive tooling and higher maintenance tooling which are generally recognized as disadvantageous when split lock tooling is utilized.

The body portion 112 of outer ring 102 is substantially cylindrical with square notch relief in the inside upper edge 113. The notch relief provides the mold cavity for the frangible elements 51. The bolt clearance holes 114 and threaded holes 115 are each arranged in a 3-hole pattern on 120 degree spacing. These holes are used for mounting and moving the outer ring 102.

In the mold arrangement 100 of FIG. 18, the inner core 101, outer ring 102 and top portion 103 are oriented in their initial position ready for plastic to be injection molded. The defined mold cavity 118 corresponds to the desired shape for inner cap 35 after accounting for the anticipated shrinkage of the polyethylene material which represents the preferred material for inner cap 35.

Figure 24:
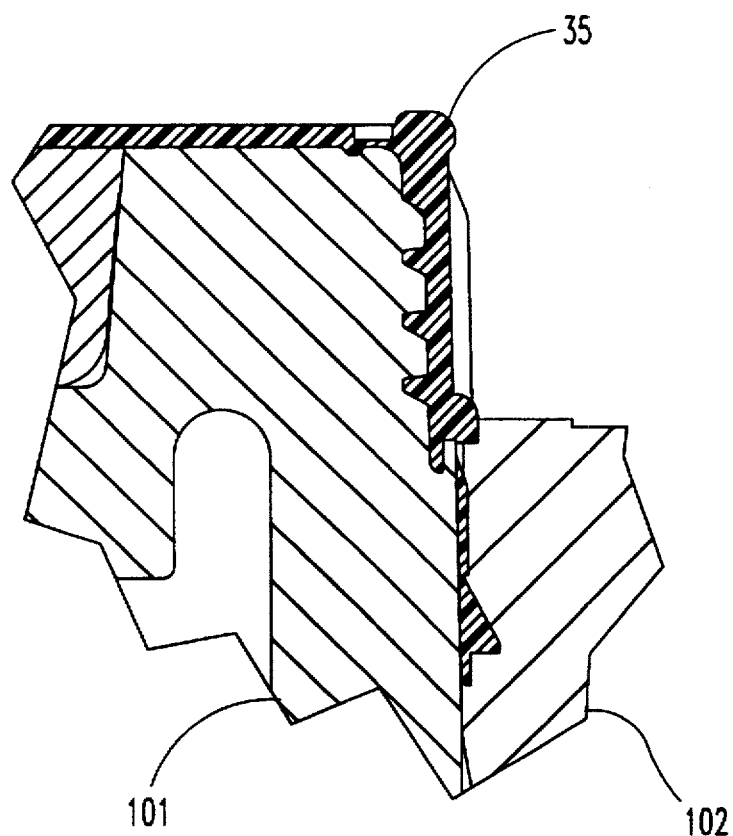
FIG. 24 is a front elevational view in full section of the FIG. 18 mold arrangement with the top portion of the mold removed.
Figure 25:
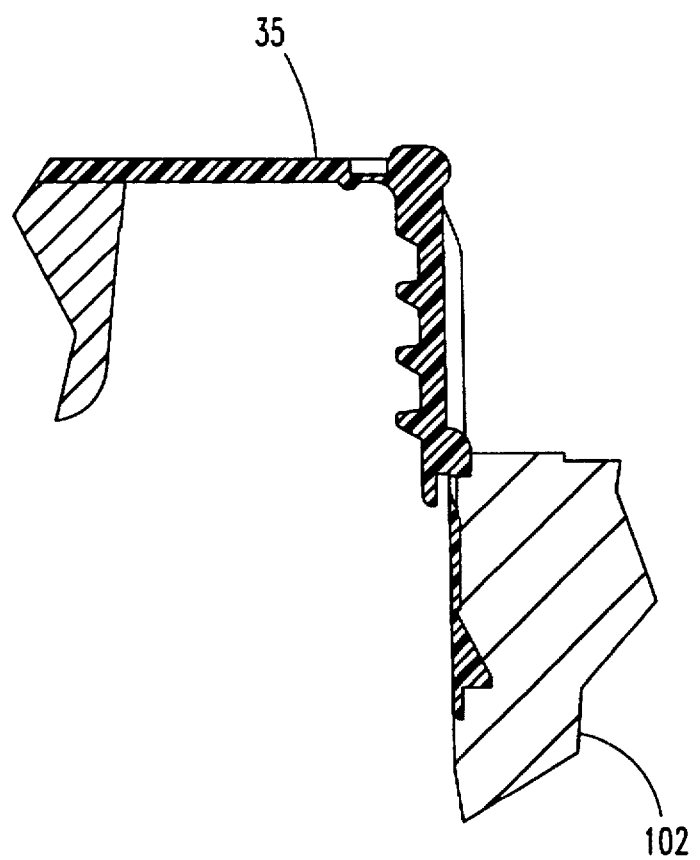
FIG. 25 is a front elevational view in full section of the FIG. 18 mold arrangement with the inner core removed.

Once the inner cap is molded, though while the plastic is still warm, the top portion 103 is able to be axially separated from the top portion of the inner cap 35 by separating sections 103a and 103b and moving each section away from the molded inner cap. The resulting configuration once the top portion 103 is removed is illustrated in FIG. 24. The next step in the ejection of the inner cap from the mold is to unscrew the inner core 101 from the molded cap. The unscrewing action effectively lowers the inner core 101 relative to the inner cap. The inner core 101 is axially lowered below the lowermost edge of tabs 49. This leaves the entire interior of molded inner cap 35 open as illustrated in FIG. 25. The final step in the molding method is to lower the unitary outer ring 102. As should be clear from the FIG. 25 illustration, the inclined surface 49e of each tab 49 protrudes radially outward and is pushed inwardly as the outer ring is removed (see FIG. 26). The various molding and ejection steps which have been described may be performed in sequences other than the one sequence depicted by FIGS. 18 and 24–26. For example, section 103a could be removed first, followed by the inner core 101 and then the outer ring 102 before finally removing section 103b.

In order to fabricate the individual frangible elements 51, the inner core 101 and outer ring 102 are placed in contact adjacent the uppermost edge of the outer ring. Individual projections of the outer ring extend radially inward into abutment with the outer surface of inner core 101. The spaces between adjacent projections create corresponding mold cavity portions which in turn result in the molding of the frangible elements. The polyethylene material used for the inner cap has a natural tendency to shrink after molding. As a consequence of this tendency, the frangible elements and their surrounding portions of the inner cap which include the undercuts in the mold between frangible elements will pull away from the inner core and outer ring. There is sufficient shrinkage to enable the use of a unitary outer ring 102 and thereby preclude the need for split block tooling which is more expensive and has higher maintenance requirements.

Figure 26:
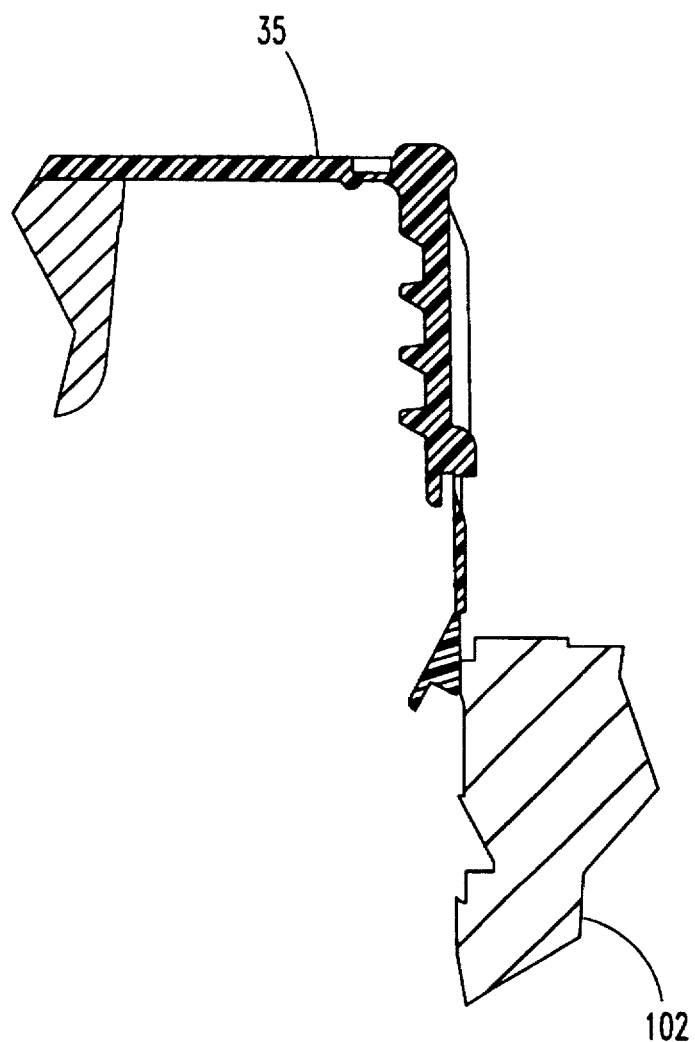
FIG. 26 is a front elevational view in full section of the FIG. 18 mold arrangement with the outer ring being removed.

As previously described, the plurality of tabs 49 are separated and connected by thin membrane sections 61. Each tab 49 is connected to the lower edge of ring 50 such that the junction of ring 50 and section 49a provides a hinge location for the initial inward bending of each tab as the outer ring 102 is separated from the molded part. The inward bending of each tab 49 as the outer ring is removed is illustrated in FIG. 26.

Due to the fact that ring 50 is circumferential and continuous in nature, it resists any radially inward bending or deflection as a result of removing the outer ring. Consequently, the hinging location is between ring 50 and tabs 49. This particular relationship between the various portions of the molded lower part of the inner cap 35 continues as the tabs 49 are folded upwardly and locked in the folded orientation behind annular bead 55.

There are two options for the procedure to fold the tabs behind the annular bead 55. With the inner cap oriented as illustrated in FIG. 26, though with the outer ring 102 completely removed, the tabs are bent inwardly. Consequently, when the inner core 101 is axially raised and reinserted into the molded inner cap 35, the outer edge of the inner core abuts up against the surfaces of the individual tabs 49. Continued upward advancement of the inner core bends the tabs upwardly and folds each tab behind the annular bead 55 where the tabs 49 are locked in position as illustrated in FIGS. 8 and 10.

Figure 27:
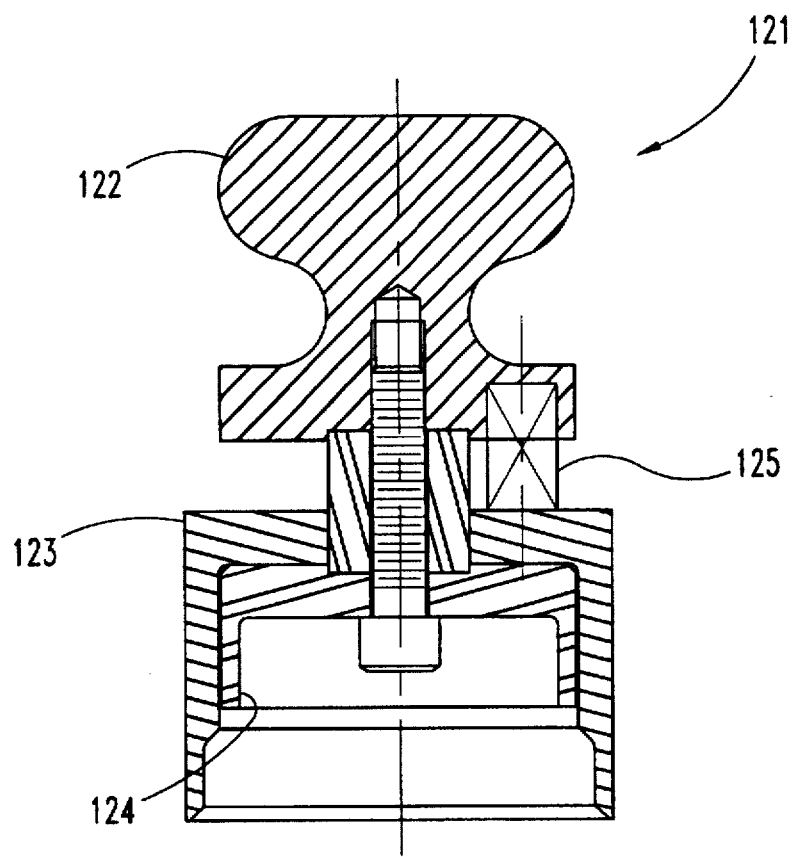
FIG. 27 is a front elevational view in full section of a tab folding apparatus which can be used in combination with the inner cap of the present invention to fold the tabs into a locked position.

Another option for bending the tabs 49 upwardly into a locked position behind annular bead 55 is to do so manually by means of the FIG. 27 tab folding apparatus 121. Apparatus 121 includes a handle 122, stationary outer sleeve 123, moveable inner plunger 124 and biasing spring 125. In order to use apparatus 121, the molded cap of FIG. 26 is inverted and the outer sleeve 123 is placed over the cap. As the handle is pushed downwardly, the inner plunger lowers, pushing against the surfaces of the folded tabs 49. This method step results in the tabs being folded into a locked position behind annular bead 55. When the handle is released so as to ready apparatus 121 for the next cap, the biasing spring returns the handle and the moveable inner plunger to their initial position as illustrated in FIG. 27.

Referring now to FIGS. 28–36, an alternative embodiment for the child-resistant arrangement of the present invention is illustrated. The basic difference between this arrangement and the already-described child-resistant arrangement of FIGS. 5, 5A, and 11–14, is the elimination of axial ribs 78. While axial ribs 56 can be retained for ease in gripping and handling the inner cap 35, the elimination of axial ribs 78 means that ovalizing of the outer cap sidewall 73 will not result in any rib-to-rib interfit in order to facilitate the removal of the inner cap. The alternative provided by the embodiment of FIGS. 28–36 is to modify the design of the depressions 64 on the inner cap 35 and to modify the design of the cooperating ratchet teeth 75 on the outer cap 36. The modification includes providing a series of cooperating angled/offset sections as part of each cap. These angled/offset sections, or ramps as they may be called, permit the lugs of the outer cap to ride up and over cooperating lugs on the inner cap when the outer cap is turned in a counter-clockwise direction without a downward force being exerted. However, when a sufficient downward force is exerted on the outer cap, while being turned in a counter-clockwise direction, these angled/offset sections are able to engage one another in an abutting relationship which permits the inner cap to be removed from the externally threaded neck finish of the container.

Figure 28:
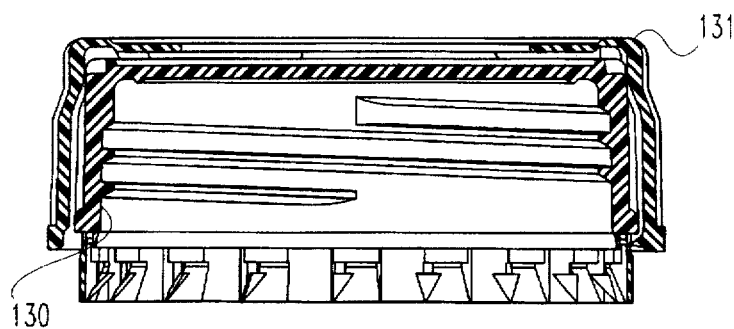
FIG. 28 is a side elevational view in full section of an outer cap assembled onto an inner cap according to a typical embodiment of the present invention.

In FIG. 28, inner cap 130 and outer cap 131 are illustrated in their assembled orientation with the outer cap 131 securely snapped over the inner cap 130 and the two caps are held in this position by means of the four equally-spaced lips 132. Except for those differences specifically noted and described, inner cap 130 is similar to inner cap 35 and outer cap 131 is similar to outer cap 36. The similarities between these two sets of corresponding caps include their size, shape, and material and their unitary molded construction. With regard to the inner cap 130, the manufacturing method and the means of folding and locking the various ratchet tabs in position is the same as that used for inner cap 35. The thread pitch of the inner cap, the external ribs of the outer cap, and the tamper-evident feature of the inner cap are all virtually identical in both embodiments. There is only a slight or minor difference in the specific shape of the tabs 49 and the ratchet-like projection 49d, but there is no significant difference between inner cap 35 and inner cap 130 in this regard and no noticeable difference functionally.

With regard to inner cap 130, a series of tabs are arranged circumferentially and are utilized as part of a break-away ring. The break-away ring provides the tamper-evident capability to the present invention.

Figure 29:
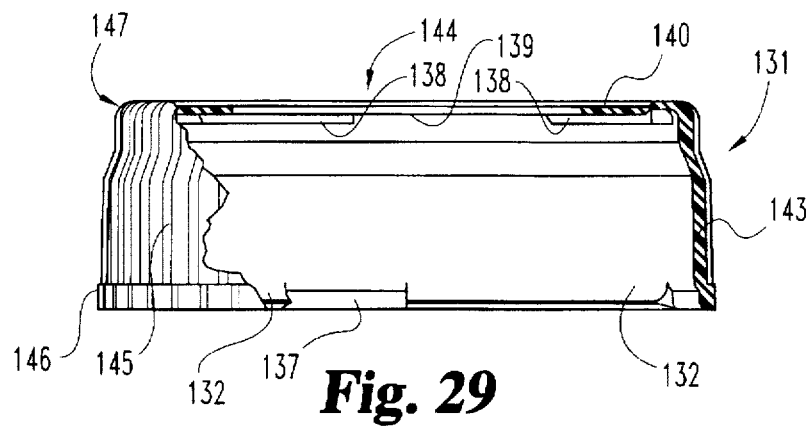
FIG. 29 is a side elevational view, in partial section, of the FIG. 28 outer cap.

FIG. 29 provides an illustration of the outer cap 131, in full section, without the inner cap 130. In this view, the arrangement of two of the four lips 132 and the open areas 137 between adjacent lips are shown. Also shown in the FIG. 29 illustration are two of the four ratchet lugs 138 which are integrally molded into the inner surface 139 of the upper wall 140. The general shape and contour of the annular sidewall 143 is also illustrated. The upper wall 140 is substantially flat and has an annular ring shape surrounding and defining interior opening 144. The outer surface of sidewall 143 includes a series of substantially parallel gripping ribs 145 which extend upwardly from the top of rim 146 to corner 147.

Figure 30:
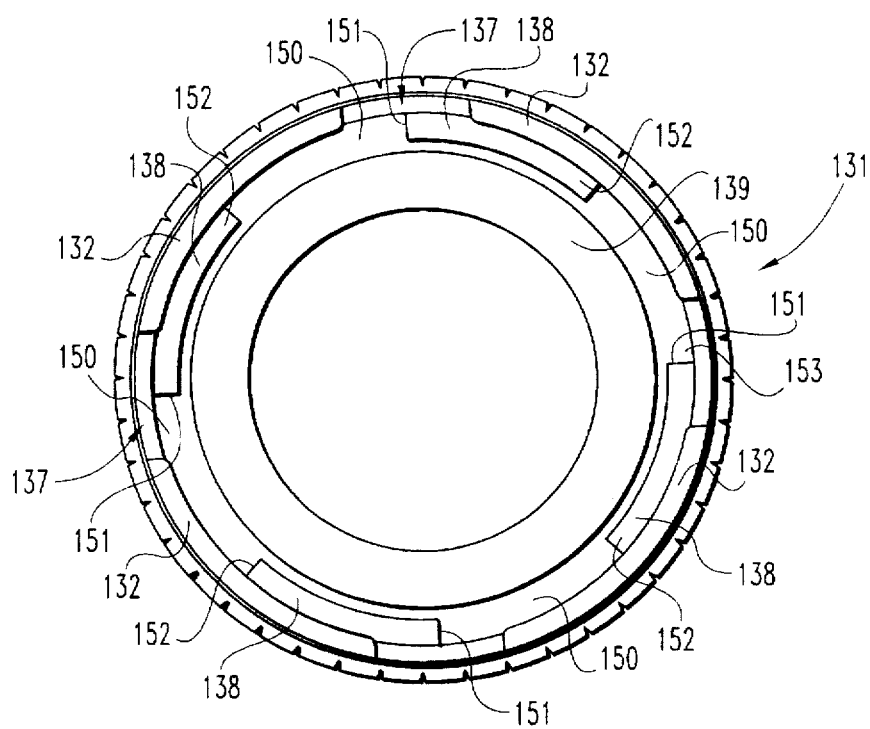
FIG. 30 is a bottom plan view of the FIG. 28 outer cap.

Referring now to FIG. 30, the size, shape, and spacing of the four lips 132, the separating open areas 137, and the four ratchet lugs 138 are illustrated. Located between each pair of adjacent lugs is a gradual ramp 150. As will be clear from the details of FIGS. 35 and 36, each ratchet lug 138 begins at the lowest end of ramp 150 with an abutment edge 151. In the FIG. 30 illustration, the clockwise direction corresponds to the counterclockwise direction for turning of the outer cap in actual use when positioned over the inner cap. Consequently, when ratchet lug 138 is described in actual use as having an abutment edge at one end and extending in a counterclockwise direction to a ramp portion 152, the direction is reversed when considering the FIG. 30 illustration. In the clockwise direction of FIG. 30, ratchet lug 138 begins with edge 151 and moves (in a clockwise direction) toward ramp portion 152. Ratchet lug 138 has a substantially uniform thickness until it reaches ramp portion 152 which portion is integral with gradual ramp 150. Ramp 150 is thickest at its interface with ramp portion 152 and gradually tapers in a clockwise direction (based upon the FIG. 30 illustration) to a thinner section 153 which is adjacent abutment edge 151. At this point the next ratchet lug 138 begins and the alternating pattern of ratchet lugs 138 and ramp portions 152 repeats. There are a total of four ratchet lugs 138 and a total of four ramp portions 152.

Figure 31:
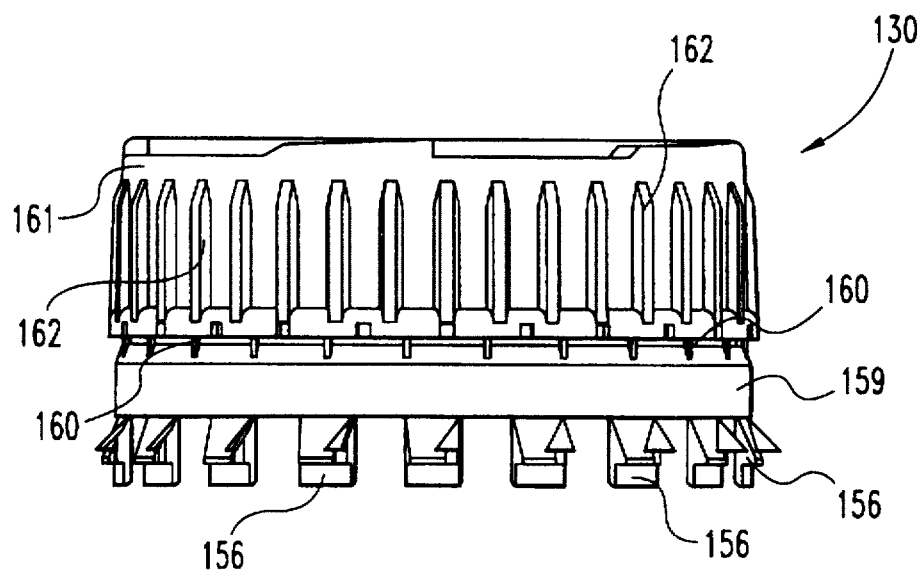
FIG. 31 is a front elevational view of the FIG. 28 inner cap according to the present invention with its interlocking tabs in a downward direction.

Referring now to FIGS. 31–34, the inner cap 130 is illustrated in greater detail without the presence of outer cap 131. Inner cap 130 is illustrated in FIG. 31 in its initially molded configuration with the ratchet-like tabs 156 in a downward extending orientation. The structure of inner cap 130 is virtually identical to the structure of inner cap 35 with the one exception that the specific geometry of the tabs 156 is a little different from tabs 49, though functionally the two styles of ratchet-like tabs 49 and 156 are virtually identical.

Figure 32:
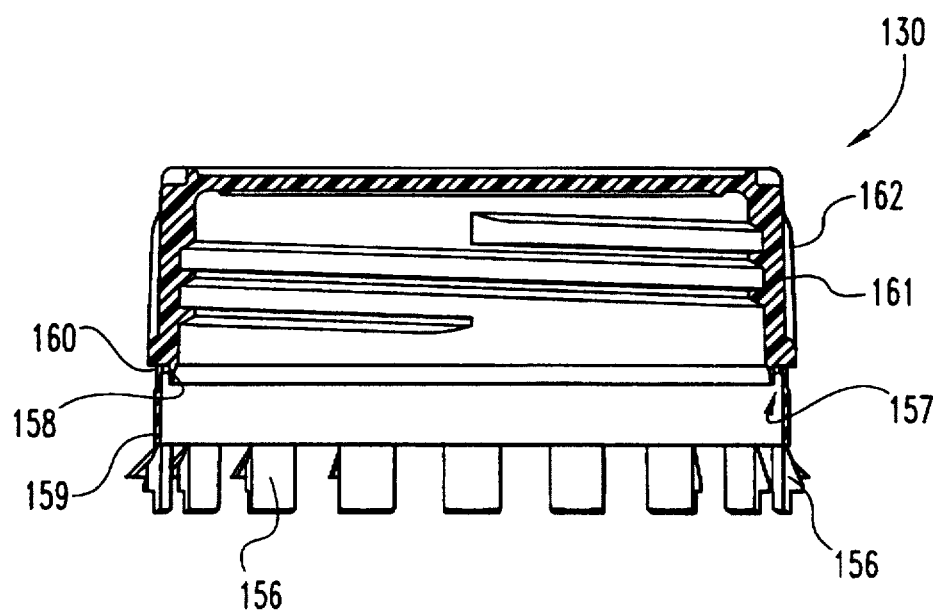
FIG. 32 is a front elevational view in full section of the FIG. 31 inner cap.

Similar to inner cap 35, inner cap 130 includes an inner annular channel 157 which corresponds to channel 54, an annular bead 158 which corresponds to bead 55, break-away ring 159 which corresponds to ring 50, and a plurality of connecting frangible elements 160 which correspond to elements 51. Cap 130 includes an outer sidewall 161 with a circumferential series of evenly-spaced, raised axial ribs 162. The internal features of cap 130 in its as-initially-molded orientation are illustrated in FIGS. 31 and 32.

Figure 33:
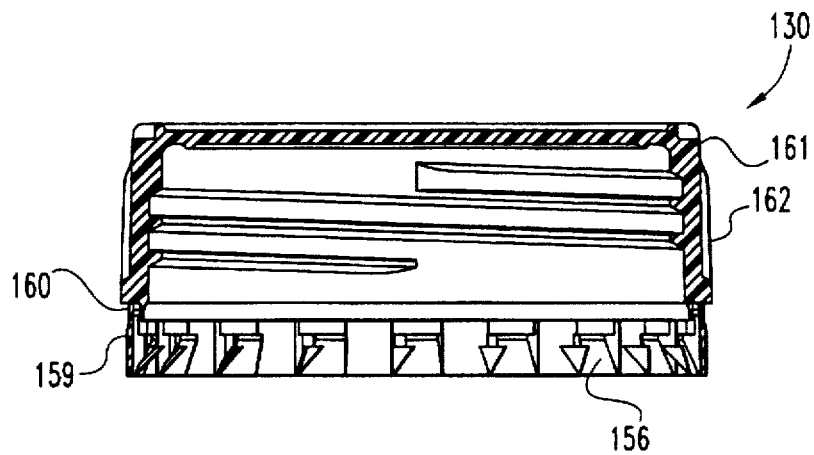
FIG. 33 is a front elevational view in full section of the FIG. 31 inner cap with the interlocking tabs folded upwardly and locked in position behind an annular bead which is formed on the interior of the inner cap according to the present invention.
Figure 33A:
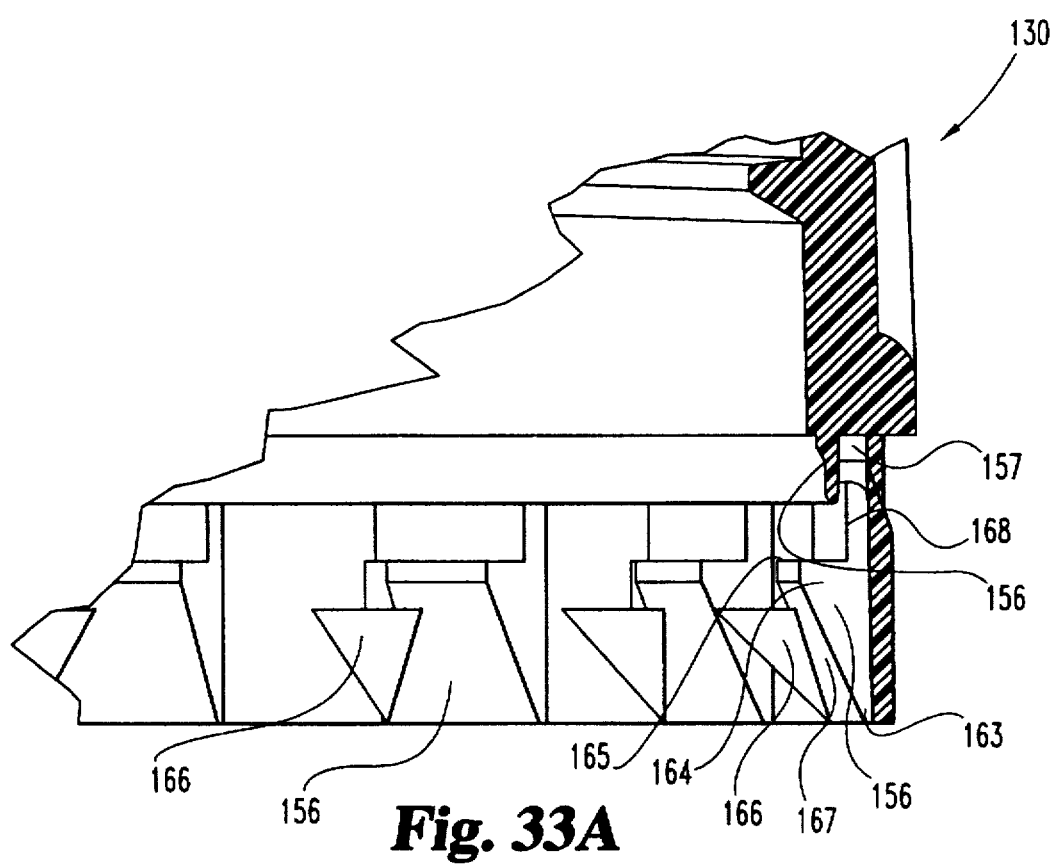
FIG. 33A is an enlarged detail of one interlocking tab of the FIG. 31 inner cap in its folded and locked position according to the present invention.

With reference to FIGS. 33 and 33A, the ratchet-like tabs 156 are illustrated in their folded orientation. As previously described relative to cap 35 and FIG. 8, the tabs 156 are part of a break-away ring 159 which provides the tamper-evident capability to the present invention. Each tab 156 has a wedge-like shape in the axial direction and the wedge-like shape is orientated with a radially-thinner section 163 positioned at the lower edge of the break-away ring 159 where the tabs 156 are hinged and extend upwardly therefrom to a radially-thicker section 164. A substantially horizontal surface 165 provides the abutment surface against the underside of annular lip 40a. At this point it should be confirmed that inner cap 130 is designed to be threadedly received by outlet opening 33 in the same manner as inner cap 35.

As should be understood, the folded tabs 156 are able to radially deflect in an outward direction so as to pass over lip 40a with advancing threaded engagement of inner cap 130 onto neck finish 32. However, any attempt to remove inner cap 130 causes surface 165 of each tab 156 to be drawn upwardly into contact with lip 40a. This abutment ultimately results in separation of the break-away ring 159 from the remainder of the inner cap 130. The lip 40a then serves to retain the ring 159 on the neck finish.

Each tab 156 also includes a ratchet-like projection 166 which has a triangular shape, an inclined surface 167, and a lip extension 168. The projections 166 engage axial ribs 41 in a ratchet-like manner such that the inner cap 130 can be advanced onto the neck finish with the tabs 156 riding over the axial ribs 41. Once the inner cap is fully engaged on the neck finish, the projections 166 interlock with the axial ribs 41 in order to prevent any backoff of the inner cap 130 from the neck finish due to vibrations and movements which can occur during shipping and handling. While the interlock may also contribute to some extent to the tamper-evident capability of the present invention, that is not the primary function of the projection 166 and rib 41 interlock. The lip extension 168 is received within channel 157.

Increasing the force level of the retrograde rotation in a counterclockwise direction will ultimately cause the tamper-evident, break-away ring 159 to sever from the remainder of the inner cap 130 by the fracture of connecting frangible elements 160. Once the frangible elements 160 break free, lip 40a helps to keep the ring 159 retained on the neck finish so that this loose ring cannot fall or dislodge into an unacceptable location such as into the receptacle where the contents of container 31 are being poured. By means of the break-away ring 159, there is a visual indication provided to the end user as to whether a newly filled and closed container has been opened after a new tamper-evident inner cap 130 is applied. Any attempt to tamper with the container and its contents will be evidenced by breakage of the frangible elements 160. If the break-away ring 159 is severed from the remainder of the inner cap 130, the end user is immediately alerted and can proceed accordingly to either test the contents of the container for contamination or simply not use the contents and select instead an unopened container.

Figure 34:
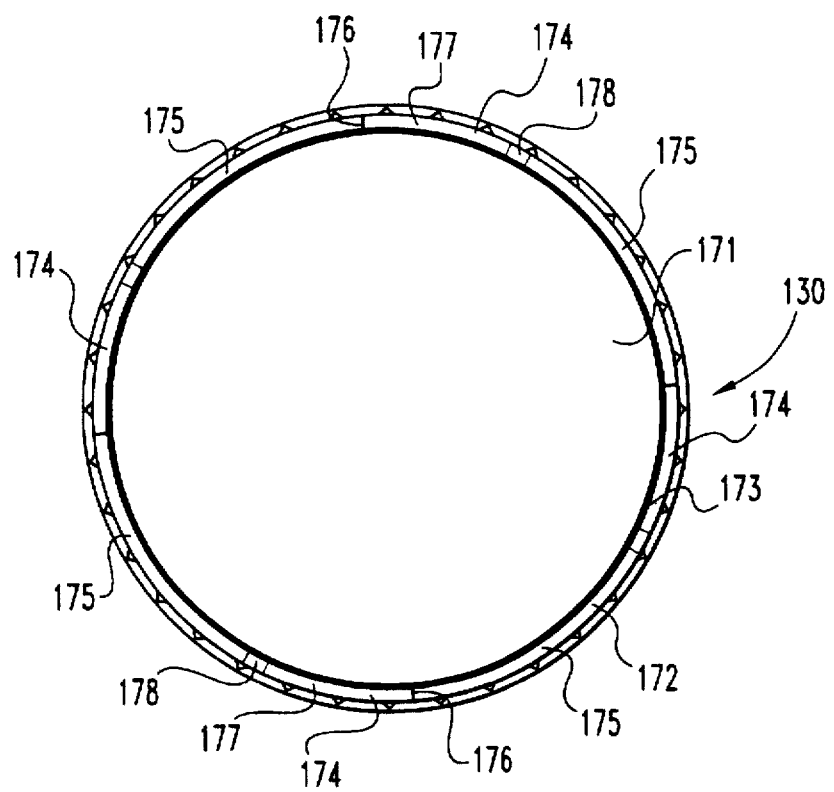
FIG. 34 is a top plan view of the FIG. 31 inner cap according to the present invention.

Referring to FIG. 34, the details of top surface 171 and outer edge 172 of inner cap 130 are illustrated. The majority of top surface 171 is substantially flat and uninterrupted. Molded annular edge 173 separates surface 171 from outer edge 172. Edge 172 is arranged with an alternating series of ratchet-like lugs 174 and flat portions 175. The entirety of each lug 174 is disposed above the flat portions 175. Each lug 174 begins with an abutment edge 176 which is substantially flat and lays within a geometric plane which is substantially perpendicular to top surface 171 and to the top surfaces of the flat portions 175. The top surface 177 of each lug 174 gradually tapers in a clockwise direction from edge 176 to ramp edge 178. While the downward inclined of surface 177 is slight, the downward incline of ramp edge 178 is steeper, being approximately 45 degrees relative to horizontal (and vertical). The circumferential length of each ratchet-like lug 174 is substantially the same and measures approximately 33 degrees. Accordingly, the circumferential length of each flat portion 175 measures approximately 57 degrees.

The alternating series of circumferentially-extending lugs 174 and circumferentially-extending flat portion 175 lay in an end-to-end pattern around the outside diameter of the top surface 171 of inner cap 130. Likewise, the circumferentially-extending ratchet lugs 138 and the circumferentially-extending gradual ramps 150 are in alternating series with each other and lay in an end-to-end pattern as part of upper wall 140 around the inside diameter of outer cap 131.

Figure 35:
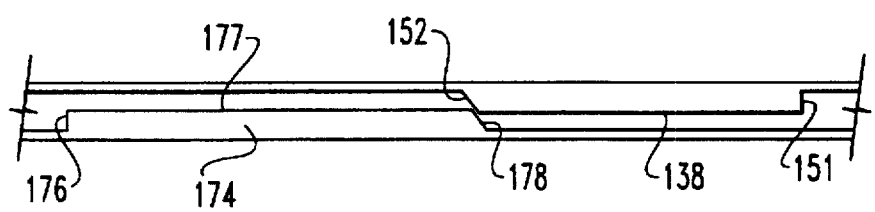
FIG. 35 is an enlarged front elevational detail of the lug engagement between the FIG. 28 outer cap and the FIG. 31 inner cap during clockwise advancing of the inner cap on the container.
Figure 36:
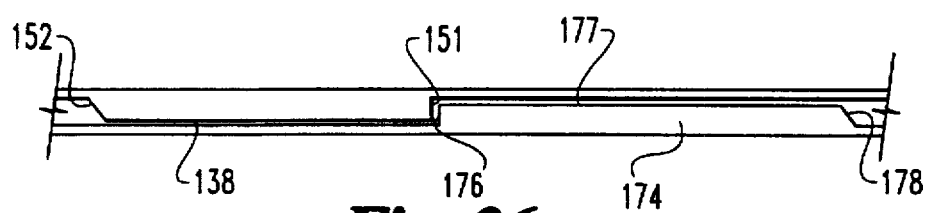
FIG. 36 is an enlarged front elevational detail of the relationship between the FIG. 28 outer cap and the FIG. 31 inner cap during counterclockwise removal of the inner cap from the container.

The relationship between the ratchet lugs 138 and ramps on the interior of the outer cap 131 and the ratchet-like lugs 174 and flat portions 175 on the exterior of the inner cap 130 is illustrated in FIGS. 35 and 36. Described generally, the outer cap is assembled over the inner cap and the four lips 132 maintain this assembled combination. There is axial movement permitted of one cap relative to the other, though the amount of axial movement is relatively slight. When the outer cap 130 is turned in a clockwise direction, each of the abutment edges 151 of the four ratchet lugs 138 are turned into abutment against a corresponding abutment edge 176 of the four ratchet-like lugs 174. The axial positioning between the two caps guarantees edge-to-edge abutment at four locations, even without having to push down or otherwise deform the outer cap 131. Engagement is guaranteed due to the fact that the axial height of the abutment edges is greater than the degree of axial movement permitted between the two caps. When engagement occurs, each of the lugs 138 is positioned over a corresponding flat portion 175 and each of the lugs 174 is positioned beneath a corresponding ramp 150. Turning the outer cap 131 in the clockwise direction threadedly advances the inner cap 130 onto the external threads 40 of the neck finish 32.

In order to threadedly disengage (i.e., remove) the inner cap from the threaded neck finish, the outer cap needs to be turned in a counterclockwise direction. However, if the outer cap is not forced down onto the inner cap, the outer cap is able to turn somewhat freely in the counterclockwise direction. This configuration thus provides the child-resistant feature and capability to this embodiment of the present invention. What occurs is that each ramp portion 152 of the four lugs 138 rides up and over the corresponding ramp edge 178 of each of the four lugs 174. While there may be, at least initially, a slight degree of resisting abutment between each of the four pairs (i.e., one ramp portion 152 and one ramp edge 178), there is enough axial separation between the two caps to permit the outer cap to ride up and over the inner cap. Since the outer cap turns without turning engagement of the inner cap, the inner cap is not unscrewed from the neck finish. As indicated, the ability of the outer cap to turn somewhat freely in the counterclockwise direction by passing up and over the corresponding lugs of the inner cap is dependent on the user not forcing the outer cap down onto the inner cap. If the outer cap is in fact forced down onto the inner cap while turning the outer cap in the counterclockwise direction, the inner cap can be removed. By restricting the axial movement of the outer cap, the ramp portions 152 engage the cooperating ramp edges 178 in a type of abutting relationship. While there is an axial force vector pushing up on the outer cap, a sufficient downward force will override this force vector. Importantly there is also a horizontal (circumferential) force vector acting on the inner cap in the counterclockwise direction and this force vector is sufficient to unscrew the inner cap from the neck finish. However, since small children can either not apply the required downward force or are not likely to both push down on the outer cap and turn the outer cap in the counterclockwise direction, the present invention is made child-resistant by this arrangement of the inner and outer caps.

When a requisite level of downward force is applied on the outer cap and this force is held while the outer cap is turned in a counterclockwise direction, the inner cap is able to be removed from the neck finish. The downward force combined with counterclockwise turning of the outer cap on the inner cap causes ramp portion 152 of lug 138 to contact ramp edge 178 of lug 174. This abutting engagement occurs at four locations and generates an upward force vector acting to push up on outer cap 131. Without the exertion of a sufficient downward force, the outer cap 131 would ride out of engagement due to the axial clearance between the inner cap and the outer cap as has been described relative to the child-resistant feature of the present invention. As should be clear from the foregoing description, if the outer cap is unrestrained it can move upwardly due to its axial separation with the inner cap, and thus the outer cap can be turned in either direction. When turned in a clockwise direction, gravity alone is sufficient to draw the outer cap down onto the inner cap to ensure abutting engagement between the two series of lugs. Additionally, normal handling and manipulation of the outer cap when turning the outer cap in a clockwise direction tends to push the outer cap in a downward direction onto the inner cap. However, the user does not need to focus on trying to apply a downward force as engagement will occur in a virtually automatic fashion due to gravity pulling the outer cap down onto the inner cap.

When removing the inner cap from the neck finish, the continued exertion of a suitable downward force while turning the outer cap in a counterclockwise direction enables the outer cap to be used as a tool for removing the inner cap. The unscrewing torque is transmitted from the outer periphery of the outer cap to the four lugs 138 and then from the four lugs 138 of the outer cap to the four lugs 174 of the inner cap. This in turn creates a counterclockwise rotation of the inner cap, causing it to unscrew from the externally threaded neck finish.

As previously indicated, if a young child could exert a sufficient downward force to effect removal of the inner cap, two manipulations must be performed simultaneously. The child must not only exert the required downward force, but the child must, at the same time, turn the outer cap in a counterclockwise direction. It has been found that combined manipulations of this type are not typically something young children are able to do. This thus enables the present invention to be described as child-resistant, as contrasted to child-proof.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tamper-evident closure for a container having an externally-threaded neck finish, said tamper-evident closure comprising:

a closure cap having an upper wall and an internally-threaded, surrounding sidewall, said sidewall extending between said upper wall and a lower edge portion, said closure cap further including an annular bead extending beyond said lower edge portion; and tamper-indicating means comprising a break-away annular ring depending from said lower edge portion of the sidewall, a plurality of frangible elements detachably securing said annular ring to said lower edge portion, and a plurality of tabs bent upwardly, said frangible elements being radially spaced outwardly from said annular bead and defining therewith an annular channel, a portion of said tabs being positioned within said annular channel, whereby said annular bead is used to hold said tabs in their folded position, and whereby said tabs cooperate with said neck finish during removal of said closure cap, causing said frangible elements to break, thereby separating said annular ring from the remainder of said closure cap.

2. The tamper-evident closure of claim 1 which further includes an outer cap having an annular ring top wall portion which defines an open center portion and further having a surrounding wall.

3. The tamper-evident closure of claim 2 wherein said outer cap is arranged in overlying relation to said closure cap and is substantially concentric therewith.

4. The tamper-evident closure of claim 1 wherein said neck finish defines a circumferentially-extending series of axial ribs and each tab of said plurality of tabs having a ratchet-like shape and said plurality of tabs being designed and constructed for anti-backoff engagement with the series of axial ribs of said neck finish.

5. A child-resistant closure assembly for a container having an externally-threaded neck finish, said child-resistant closure assembly comprising:

an inner cap having an upper wall and an internally-threaded, surrounding sidewall which is constructed and arranged for threaded engagement with said neck finish, said upper wall having an upper surface;

an outer cap assembled onto said inner cap with axial clearance and including a top wall and a surrounding sidewall, said top wall having an inside surface;

an alternating series of circumferentially-extending ratchet-like first lugs and circumferentially-extending first intermediate portions in an end-to-end pattern as part of said inside surface, each first lug of said pattern having an abutment surface at a first end and a ramp surface at an oppositely-disposed second end;

an alternating series of circumferentially-extending ratchet-like second lugs and circumferentially-extending second intermediate portions in an end-to-end pattern as part of said upper surface, each second lug of said pattern having an abutment surface at a first end and a ramp surface at an oppositely-disposed second end;

said inner cap and said outer cap being cooperatively arranged such that the abutment surfaces of said first lugs are positioned against the abutment surfaces of said second lugs upon clockwise rotation of the outer cap, thereby threadedly advancing the inner cap onto said neck finish; and said inner cap and said outer cap being cooperatively arranged such that the ramp surfaces of said first lugs are positioned adjacent the ramp surfaces of said second lugs upon counterclockwise rotation of the outer cap whereby the first lugs are allowed to ride over the second lugs due to the axial clearance and whereby when a downward force is applied to the outer cap so as to eliminate the axial clearance while turning the outer cap in the counterclockwise direction, the outer cap is able to turn the inner cap due to the abutment of the ramp surfaces of the first lugs against the ramp surfaces of the second lugs.

6. The child-resistant closure assembly of claim 5 wherein said inner cap further includes a lower edge portion and in unitary construction with said sidewall and said lower edge portion an annular bead downwardly extending beyond said lower edge portion.

7. The child-resistant closure assembly of claim 6 which further includes tamper-indicating means comprising a break-away annular ring depending from said lower edge portion.

8. The child-resistant closure assembly of claim 7 wherein said tamper-indicating means further includes a plurality of frangible elements detachably securing said annular ring to said lower edge portion.

9. The child-resistant closure assembly of claim 8 wherein said tamper-indicating means further includes a plurality of tabs bent upwardly, said frangible elements being radially spaced outwardly from said annular bead and defining therewith an annular channel, a portion of said tabs being positioned within said annular channel, whereby said annular bead is used to hold said tabs in their folded position.

10. The child-resistant closure assembly of claim 5 which further includes tamper-indicating means comprising a break-away annular ring depending from a lower edge portion of the sidewall.

11. A child-resistant closure for a container having an externally-threaded neck finish, said child-resistant closure comprising:

an outer cap having a top wall portion and a surrounding sidewall;

an inner cap having an upper wall and an internally-threaded, surrounding sidewall for engagement with the neck finish of the container, the outer cap overlying the inner cap and being substantially concentric therewith;

an annular ring pattern of ratchet teeth in unitary construction with said annular ring top wall portion and oriented toward the upper wall of said inner cap, said upper wall having formed therein an annular ring pattern of receiving depressions and said ratchet teeth engaging said receiving depressions when the outer cap is turned in a clockwise advancing direction so as to rotate the inner and outer caps together and thereby cause the advancing threaded engagement of the inner cap onto the neck finish, the ratchet teeth sliding over the receiving depressions when the outer cap is turned in a counterclockwise removal direction, at least one series of axial ribs in unitary construction with the sidewall of said outer cap and oriented towards the sidewall of said inner cap; a plurality of axial ribs in unitary construction with the sidewall of said inner cap and oriented toward the sidewall of said outer cap, whereby ovalizing of said outer cap by oppositely and inwardly directed compressive forces brings a plurality of said axial ribs of said outer cap into the proximity of the axial ribs of said inner cap whereby turning of the outer cap in a counterclockwise removal direction results in axial rib engagement to enable the inner cap to be threadedly removed from the neck finish; and tamper-indicating means comprising a break-away annular ring depending from a lower edge portion of the sidewall of said inner cap, said tamper-indicating means further including a plurality of frangible elements detachably securing said annular ring to said lower edge portion, said tamper-indicating means further including a plurality of tabs bent upwardly, said frangible elements being radially spaced outwardly from said annular bead and defining therewith an annular channel, a portion of said tabs being positioned within said annular channel, whereby said annular bead is used to hold said tabs in their folded position, and whereby tab abutment against said annular lip during removal of said inner cap causes said frangible elements to break, separating said annular ring from the remainder of said inner cap.

\* \* \* \* \*